United States Patent
Liu et al.

(10) Patent No.: US 11,950,222 B2
(45) Date of Patent: Apr. 2, 2024

(54) TECHNIQUES FOR WIRELESS COMMUNICATION USING SUB-SLOT BASED PHYSICAL SIDELINK SHARED CHANNELS

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Tao Luo, San Diego, CA (US); Sony Akkarakaran, Poway, CA (US); Xiaojie Wang, Hillsborough, NJ (US); Lik Hang Silas Fong, Bridgewater, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/335,706

(22) Filed: Jun. 1, 2021

(65) Prior Publication Data

US 2022/0386328 A1 Dec. 1, 2022

(51) Int. Cl.
*H04W 72/1263* (2023.01)
*H04L 1/00* (2006.01)
*H04L 5/00* (2006.01)
*H04W 72/0446* (2023.01)
*H04W 72/20* (2023.01)

(52) U.S. Cl.
CPC ....... *H04W 72/1263* (2013.01); *H04L 1/0004* (2013.01); *H04L 1/001* (2013.01); *H04L 5/0048* (2013.01); *H04L 5/0055* (2013.01); *H04W 72/0446* (2013.01); *H04W 72/20* (2023.01)

(58) Field of Classification Search
CPC ..... H04L 1/0004; H04L 1/001; H04L 5/0048; H04L 5/0055; H04L 1/0003; H04L 1/0008; H04L 1/0009; H04L 1/0013; H04L 1/0025; H04W 72/1263; H04W 72/0446; H04W 72/20; H04W 72/40
See application file for complete search history.

(56) References Cited

U.S. PATENT DOCUMENTS

| | | | |
|---|---|---|---|
| 2020/0275458 A1* | 8/2020 | Khoryaev | H04W 92/18 |
| 2021/0067290 A1* | 3/2021 | Chen | H04L 5/0033 |
| 2021/0266895 A1* | 8/2021 | Wang | H04L 5/0048 |
| 2022/0377761 A1* | 11/2022 | Lee | H04W 4/40 |
| 2022/0399927 A1* | 12/2022 | Tsai | H04B 7/0617 |

* cited by examiner

*Primary Examiner* — Rina C Pancholi
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot. The UE may communicate in one or more PSSCHs, of the multiple PSSCHs, within the slot based at least in part on the configuration. Numerous other aspects are described.

28 Claims, 14 Drawing Sheets

TECHNIQUES FOR WIRELESS COMMUNICATION USING SUB-SLOT BASED PHYSICAL SIDELINK SHARED CHANNELS

FIELD OF THE DISCLOSURE

Aspects of the present disclosure generally relate to wireless communication and to techniques and apparatuses for wireless communication using sub-slot based physical sidelink shared channels.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot; and communicating in one or more PSSCHs, of the multiple PSSCHs, within the slot based at least in part on the configuration.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

In some aspects, the method includes receiving first-stage sidelink control information (SCI-1) that indicates a PSSCH pattern in a time domain for the multiple PSSCHs.

In some aspects, the configuration indicates multiple PSSCH patterns, and the SCI-1 includes an index that identifies the PSSCH pattern from the multiple PSSCH patterns.

In some aspects, the PSSCH pattern is indicated via a demodulation reference signal pattern indicated in the SCI-1.

In some aspects, the method includes receiving a physical sidelink control channel (PSCCH) communication that includes control information applicable to all of the PSSCHs in the slot.

In some aspects, the PSCCH communication indicates at least one of: a common resource reservation for all PSSCHs in the slot, a priority associated with all PSSCHs in the slot, or a second-stage sidelink control information format for all PSSCHs in the slot.

In some aspects, the method includes receiving first-stage sidelink control information that indicates whether the multiple PSSCHs are enabled or disabled for the slot.

In some aspects, each PSSCH, of the multiple PSSCHs, includes, in an initial symbol of that PSSCH, second-stage sidelink control information (SCI-2) for that PSSCH.

In some aspects, the SCI-2 indicates at least one of: a modulation and coding scheme for a corresponding PSSCH, or one or more resources for transmission of acknowledgement or negative acknowledgement feedback associated with the corresponding PSSCH.

In some aspects, the method includes receiving first-stage sidelink control information that indicates a common modulation and coding scheme for all PSSCHs in the slot; and overriding the common modulation and coding scheme for a particular PSSCH with a per-PSSCH modulation and coding scheme indicated in SCI-2 corresponding to the particular PSSCH.

In some aspects, the method includes receiving SCI-1 that indicates one or more values of a rate matching parameter for multiple SCI-2 corresponding to the multiple PSSCHs within the slot.

In some aspects, the SCI-1 indicates different values of the rate matching parameter for different PSSCHs within the slot.

In some aspects, the SCI-1 indicates a common value of the rate matching parameter for all PSSCHs within the slot.

In some aspects, a common modulation and coding scheme, indicated in first-stage sidelink control information for all PSSCHs within the slot, is used to determine resource elements for a particular SCI-2 for rate matching of resource elements for a PSSCH corresponding to the particular SCI-2.

In some aspects, one or more symbols of a particular SCI-2 are mapped to demodulation reference signal symbols that occur at a beginning of a PSSCH corresponding to the particular SCI-2.

In some aspects, communication in the one or more PSSCHs comprises: transmitting data in a first PSSCH, of the one or more PSSCHs, in which a data transmission is scheduled; and transmitting padding in a second PSSCH, of the one or more PSSCHs, in which a data transmission is not scheduled.

In some aspects, a method of wireless communication performed by a base station includes determining a configuration that indicates multiple time intervals corresponding to multiple PSSCHs within a slot, wherein at least one PSSCH, of the multiple PSSCHs, starts in a symbol other than an initial data symbol of the slot; and transmitting the configuration to a user equipment.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

In some aspects, a UE includes one or more memories and one or more processors, coupled to the one or more memories, configured to receive a configuration that indicates multiple time intervals corresponding to multiple PSSCHs within a slot, wherein at least one PSSCH, of the multiple PSSCHs, starts in a symbol other than an initial data symbol of the slot; and communicate in one or more PSSCHs, of the multiple PSSCHs, within the slot based at least in part on the configuration.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

In some aspects, the one or more processors are further configured to receive SCI-1 that indicates a PSSCH pattern in a time domain for the multiple PSSCHs.

In some aspects, the configuration indicates multiple PSSCH patterns, and the SCI-1 includes an index that identifies the PSSCH pattern from the multiple PSSCH patterns.

In some aspects, the PSSCH pattern is indicated via a demodulation reference signal pattern indicated in the SCI-1.

In some aspects, the one or more processors are further configured to receive a PSCCH communication that includes control information applicable to all of the PSSCHs in the slot.

In some aspects, the PSCCH communication indicates at least one of: a common resource reservation for all PSSCHs in the slot, a priority associated with all PSSCHs in the slot, or a second-stage sidelink control information format for all PSSCHs in the slot.

In some aspects, the one or more processors are further configured to receive first-stage sidelink control information that indicates whether the multiple PSSCHs are enabled or disabled for the slot.

In some aspects, each PSSCH, of the multiple PSSCHs, includes, in an initial symbol of that PSSCH, SCI-2 for that PSSCH.

In some aspects, the SCI-2 indicates at least one of: a modulation and coding scheme for a corresponding PSSCH, or one or more resources for transmission of acknowledgement or negative acknowledgement feedback associated with the corresponding PSSCH.

In some aspects, the one or more processors are further configured to: receive first-stage sidelink control information that indicates a common modulation and coding scheme for all PSSCHs in the slot; and override the common modulation and coding scheme for a particular PSSCH with a per-PSSCH modulation and coding scheme indicated in SCI-2 corresponding to the particular PSSCH.

In some aspects, the one or more processors are further configured to receive SCI-1 that indicates one or more values of a rate matching parameter for multiple SCI-2 corresponding to the multiple PSSCHs within the slot.

In some aspects, the SCI-1 indicates different values of the rate matching parameter for different PSSCHs within the slot.

In some aspects, the SCI-1 indicates a common value of the rate matching parameter for all PSSCHs within the slot.

In some aspects, a common modulation and coding scheme, indicated in first-stage sidelink control information for all PSSCHs within the slot, is used to determine resource elements for a particular SCI-2 for rate matching of resource elements for a PSSCH corresponding to the particular SCI-2.

In some aspects, one or more symbols of a particular SCI-2 are mapped to demodulation reference signal symbols that occur at a beginning of a PSSCH corresponding to the particular SCI-2.

In some aspects, communication in the one or more PSSCHs comprises: transmit data in a first PSSCH, of the one or more PSSCHs, in which a data transmission is scheduled; and transmit padding in a second PSSCH, of the one or more PSSCHs, in which a data transmission is not scheduled.

In some aspects, a base station includes one or more memories and one or more processors, coupled to the one or more memories, configured to determine a configuration that indicates multiple time intervals corresponding to multiple PSSCHs within a slot, wherein at least one PSSCH, of the multiple PSSCHs, starts in a symbol other than an initial data symbol of the slot; and transmit the configuration to a user equipment.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

In some aspects, a non-transitory computer-readable medium storing a set of instructions includes one or more instructions that, when executed by one or more processors of a UE, cause the UE to receive a configuration that indicates multiple time intervals corresponding to multiple PSSCHs within a slot, wherein at least one PSSCH, of the multiple PSSCHs, starts in a symbol other than an initial data symbol of the slot; and communicate in one or more PSSCHs, of the multiple PSSCHs, within the slot based at least in part on the configuration.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

In some aspects, the one or more instructions further cause the UE to receive SCI-1 that indicates a PSSCH pattern in a time domain for the multiple PSSCHs.

In some aspects, the configuration indicates multiple PSSCH patterns, and the SCI-1 includes an index that identifies the PSSCH pattern from the multiple PSSCH patterns.

In some aspects, the PSSCH pattern is indicated via a demodulation reference signal pattern indicated in the SCI-1.

In some aspects, the one or more instructions further cause the UE to receive a PSCCH communication that includes control information applicable to all of the PSSCHs in the slot.

In some aspects, the PSCCH communication indicates at least one of: a common resource reservation for all PSSCHs in the slot, a priority associated with all PSSCHs in the slot, or a second-stage sidelink control information format for all PSSCHs in the slot.

In some aspects, the one or more instructions further cause the UE to receive first-stage sidelink control information that indicates whether the multiple PSSCHs are enabled or disabled for the slot.

In some aspects, each PSSCH, of the multiple PSSCHs, includes, in an initial symbol of that PSSCH, SCI-2 for that PSSCH.

In some aspects, the SCI-2 indicates at least one of: a modulation and coding scheme for a corresponding PSSCH, or one or more resources for transmission of acknowledgement or negative acknowledgement feedback associated with the corresponding PSSCH.

In some aspects, the one or more instructions further cause the UE to: receive first-stage sidelink control information that indicates a common modulation and coding scheme for all PSSCHs in the slot; and override the common modulation and coding scheme for a particular PSSCH with a per-PSSCH modulation and coding scheme indicated in SCI-2 corresponding to the particular PSSCH.

In some aspects, the one or more instructions further cause the UE to receive SCI-1 that indicates one or more values of a rate matching parameter for multiple SCI-2 corresponding to the multiple PSSCHs within the slot.

In some aspects, the SCI-1 indicates different values of the rate matching parameter for different PSSCHs within the slot.

In some aspects, the SCI-1 indicates a common value of the rate matching parameter for all PSSCHs within the slot.

In some aspects, a common modulation and coding scheme, indicated in first-stage sidelink control information for all PSSCHs within the slot, is used to determine resource elements for a particular SCI-2 for rate matching of resource elements for a PSSCH corresponding to the particular SCI-2.

In some aspects, one or more symbols of a particular SCI-2 are mapped to demodulation reference signal symbols that occur at a beginning of a PSSCH corresponding to the particular SCI-2.

In some aspects, the one or more instructions further cause the UE to: transmit data in a first PSSCH, of the one or more PSSCHs, in which a data transmission is scheduled; and transmit padding in a second PSSCH, of the one or more PSSCHs, in which a data transmission is not scheduled.

In some aspects, a non-transitory computer-readable medium storing a set of instructions includes one or more instructions that, when executed by one or more processors of a base station, cause the base station to determine a configuration that indicates multiple time intervals corresponding to multiple PSSCHs within a slot, wherein at least one PSSCH, of the multiple PSSCHs, starts in a symbol other than an initial data symbol of the slot; and transmit the configuration to a user equipment.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

In some aspects, an apparatus includes means for receiving a configuration that indicates multiple time intervals corresponding to multiple PSSCHs within a slot, wherein at least one PSSCH, of the multiple PSSCHs, starts in a symbol other than an initial data symbol of the slot; and means for communicating in one or more PSSCHs, of the multiple PSSCHs, within the slot based at least in part on the configuration.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

In some aspects, the apparatus includes means for receiving SCI-1 that indicates a PSSCH pattern in a time domain for the multiple PSSCHs.

In some aspects, the configuration indicates multiple PSSCH patterns, and the SCI-1 includes an index that identifies the PSSCH pattern from the multiple PSSCH patterns.

In some aspects, the PSSCH pattern is indicated via a demodulation reference signal pattern indicated in the SCI-1.

In some aspects, the apparatus includes means for receiving a PSCCH communication that includes control information applicable to all of the PSSCHs in the slot.

In some aspects, the PSCCH communication indicates at least one of: a common resource reservation for all PSSCHs in the slot, a priority associated with all PSSCHs in the slot, or a second-stage sidelink control information format for all PSSCHs in the slot.

In some aspects, the apparatus includes means for receiving first-stage sidelink control information that indicates whether the multiple PSSCHs are enabled or disabled for the slot.

In some aspects, each PSSCH, of the multiple PSSCHs, includes, in an initial symbol of that PSSCH, SCI-2 for that PSSCH.

In some aspects, the SCI-2 indicates at least one of: a modulation and coding scheme for a corresponding PSSCH, or one or more resources for transmission of acknowledgement or negative acknowledgement feedback associated with the corresponding PSSCH.

In some aspects, the apparatus includes means for receiving first-stage sidelink control information that indicates a common modulation and coding scheme for all PSSCHs in the slot; and means for overriding the common modulation and coding scheme for a particular PSSCH with a per-PSSCH modulation and coding scheme indicated in SCI-2 corresponding to the particular PSSCH.

In some aspects, the apparatus includes means for receiving SCI-1 that indicates one or more values of a rate matching parameter for multiple SCI-2 corresponding to the multiple PSSCHs within the slot.

In some aspects, the SCI-1 indicates different values of the rate matching parameter for different PSSCHs within the slot.

In some aspects, the SCI-1 indicates a common value of the rate matching parameter for all PSSCHs within the slot.

In some aspects, a common modulation and coding scheme, indicated in first-stage sidelink control information for all PSSCHs within the slot, is used to determine resource elements for a particular SCI-2 for rate matching of resource elements for a PSSCH corresponding to the particular SCI-2.

In some aspects, one or more symbols of a particular SCI-2 are mapped to demodulation reference signal symbols that occur at a beginning of a PSSCH corresponding to the particular SCI-2.

In some aspects, the apparatus includes means for transmitting data in a first PSSCH, of the one or more PSSCHs, in which a data transmission is scheduled; and means for transmitting padding in a second PSSCH, of the one or more PSSCHs, in which a data transmission is not scheduled.

In some aspects, an apparatus includes means for determining a configuration that indicates multiple time intervals corresponding to multiple PSSCHs within a slot, wherein at least one PSSCH, of the multiple PSSCHs, starts in a symbol other than an initial data symbol of the slot; and means for transmitting the configuration to a user equipment.

In some aspects, the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

In some aspects, the multiple PSSCHs are contiguous within the slot.

In some aspects, an initial PSSCH, scheduled in the initial data symbol of the slot, includes a physical sidelink control channel.

In some aspects, each PSSCH, of the multiple PSSCHs, is fully contained within the slot and does not cross a slot boundary.

In some aspects, each PSSCH, of the multiple PSSCHs, includes at least one demodulation reference signal.

In some aspects, an initial PSSCH, scheduled in the initial data symbol of the slot, uses a legacy demodulation reference symbol pattern if a number of symbols included in the initial PSSCH satisfies a threshold.

In some aspects, an initial PSSCH, scheduled in the initial data symbol of the slot, includes a single demodulation reference signal in the initial data symbol if a number of symbols included in the initial PSSCH does not satisfy a threshold.

In some aspects, each PSSCH, that starts in a symbol other than the initial data symbol of the slot, includes a demodulation reference signal in an initial symbol of that PSSCH.

In some aspects, the configuration indicates a location of one or more demodulation reference signals within one or more PSSCHs of the multiple PSSCHs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
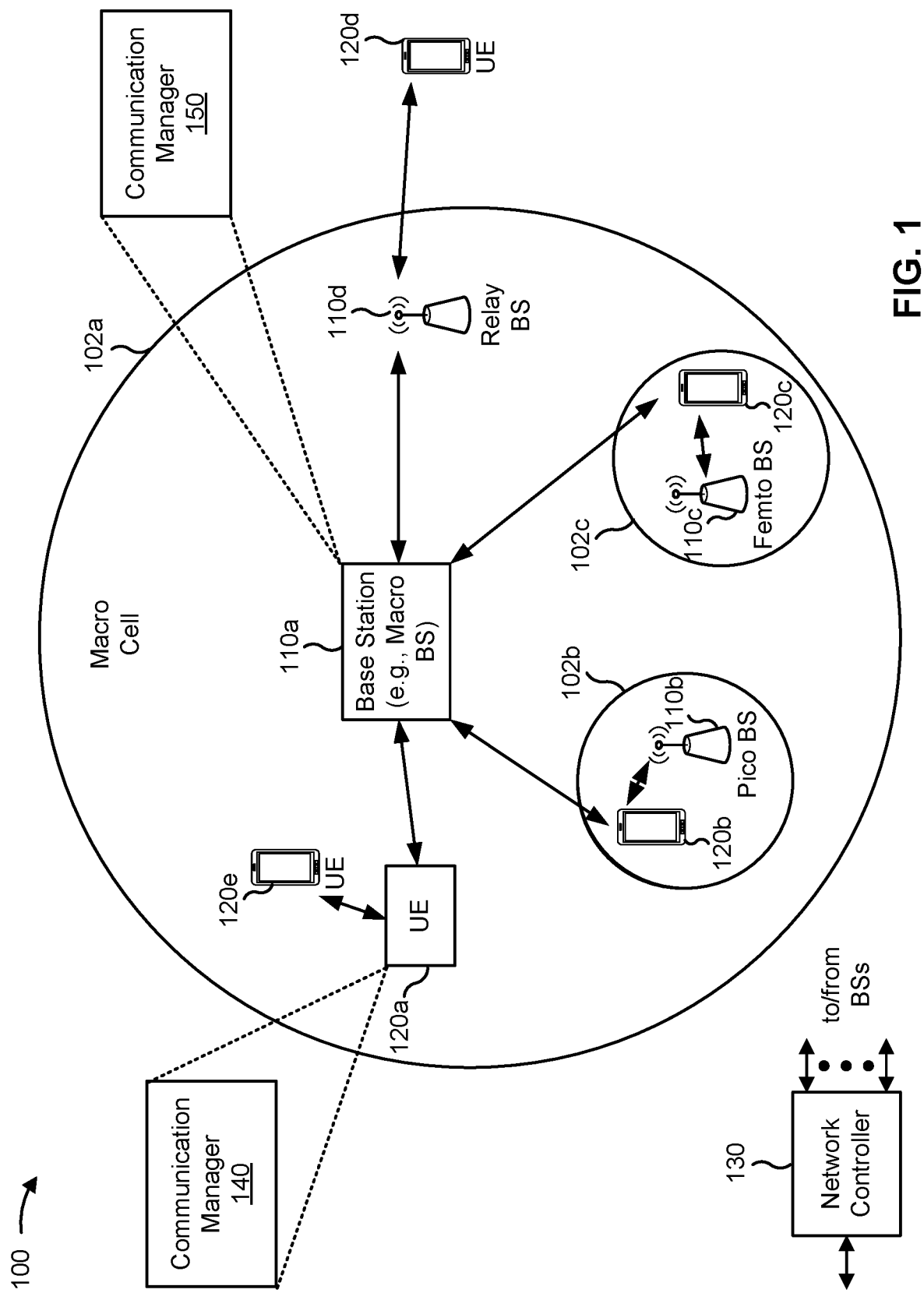
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or a vehicle-to-pedestrian (V2P) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot and communicate in one or more PSSCHs, of the multiple PSSCHs, within the slot based at least in part on the configuration. Additionally, or alternatively, the communication manager 140 may perform one or more other operations described herein.

In some aspects, the base station 110 may include a communication manager 150. As described in more detail elsewhere herein, the communication manager 150 may determine a configuration that indicates multiple time intervals corresponding to multiple PSSCHs within a slot, wherein at least one PSSCH, of the multiple PSSCHs, starts in a symbol other than an initial data symbol of the slot and transmit the configuration to a user equipment. Additionally, or alternatively, the communication manager 150 may perform one or more other operations described herein.

As indicated above, FIG. 1 is provided as an example. Other examples may differ from what is described with regard to FIG. 1.

Figure 2:
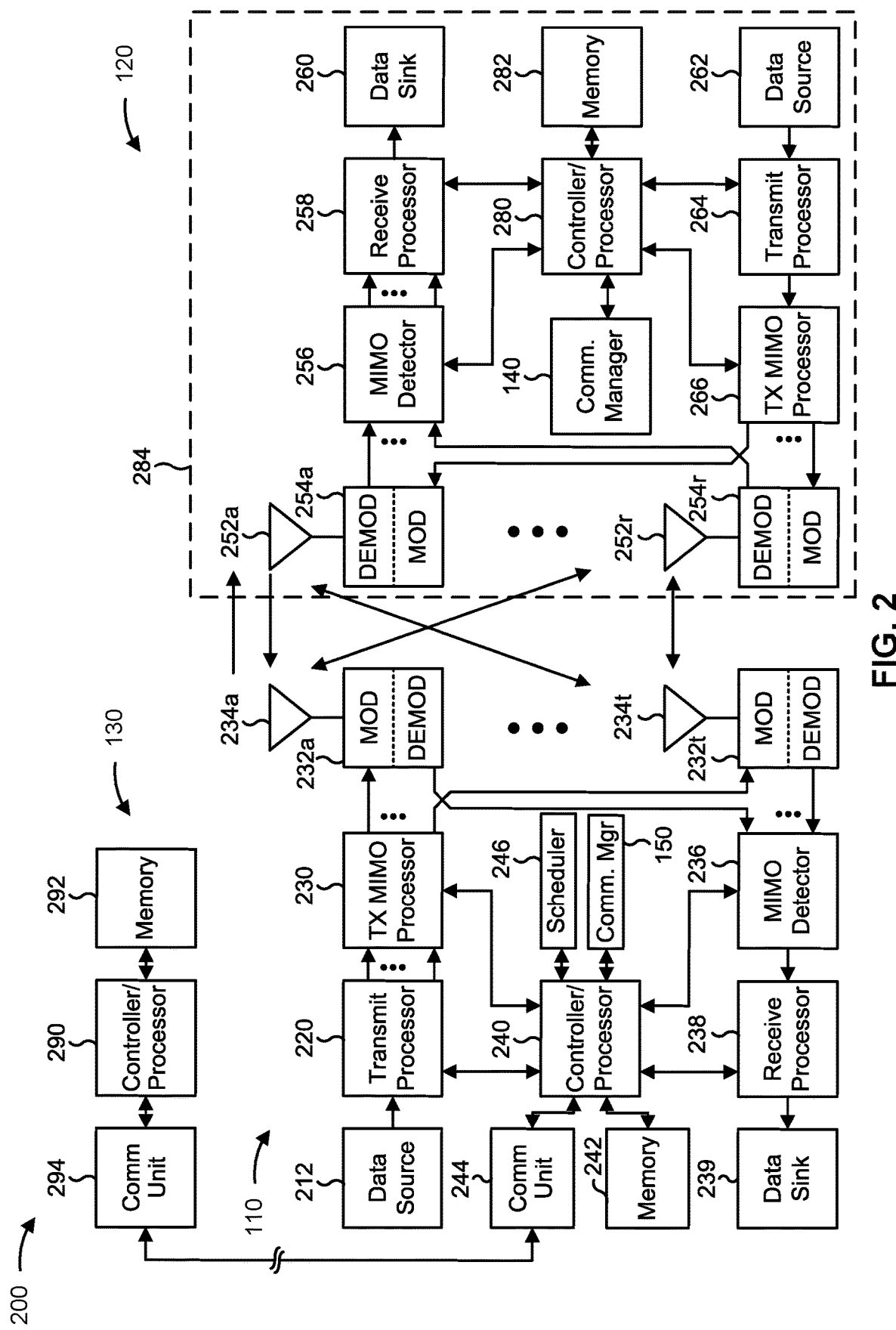
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-12).

Controller/processor 240 of base station 110, controller/processor 280 of UE 120, and/or any other component(s) of FIG. 2 may perform one or more techniques associated with wireless communication using sub-slot based physical sidelink shared channels, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions.

In some aspects, the UE includes means for receiving a configuration that indicates multiple time intervals corresponding to multiple PSSCHs within a slot, wherein at least one PSSCH, of the multiple PSSCHs, starts in a symbol other than an initial data symbol of the slot; and/or means for communicating in one or more PSSCHs, of the multiple PSSCHs, within the slot based at least in part on the configuration. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for determining a configuration that indicates multiple time intervals corresponding to multiple PSSCHs within a slot, wherein at least one PSSCH, of the multiple PSSCHs, starts in a symbol other than an initial data symbol of the slot; and/or means for transmitting the configuration to a user equipment. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

Figure 3:
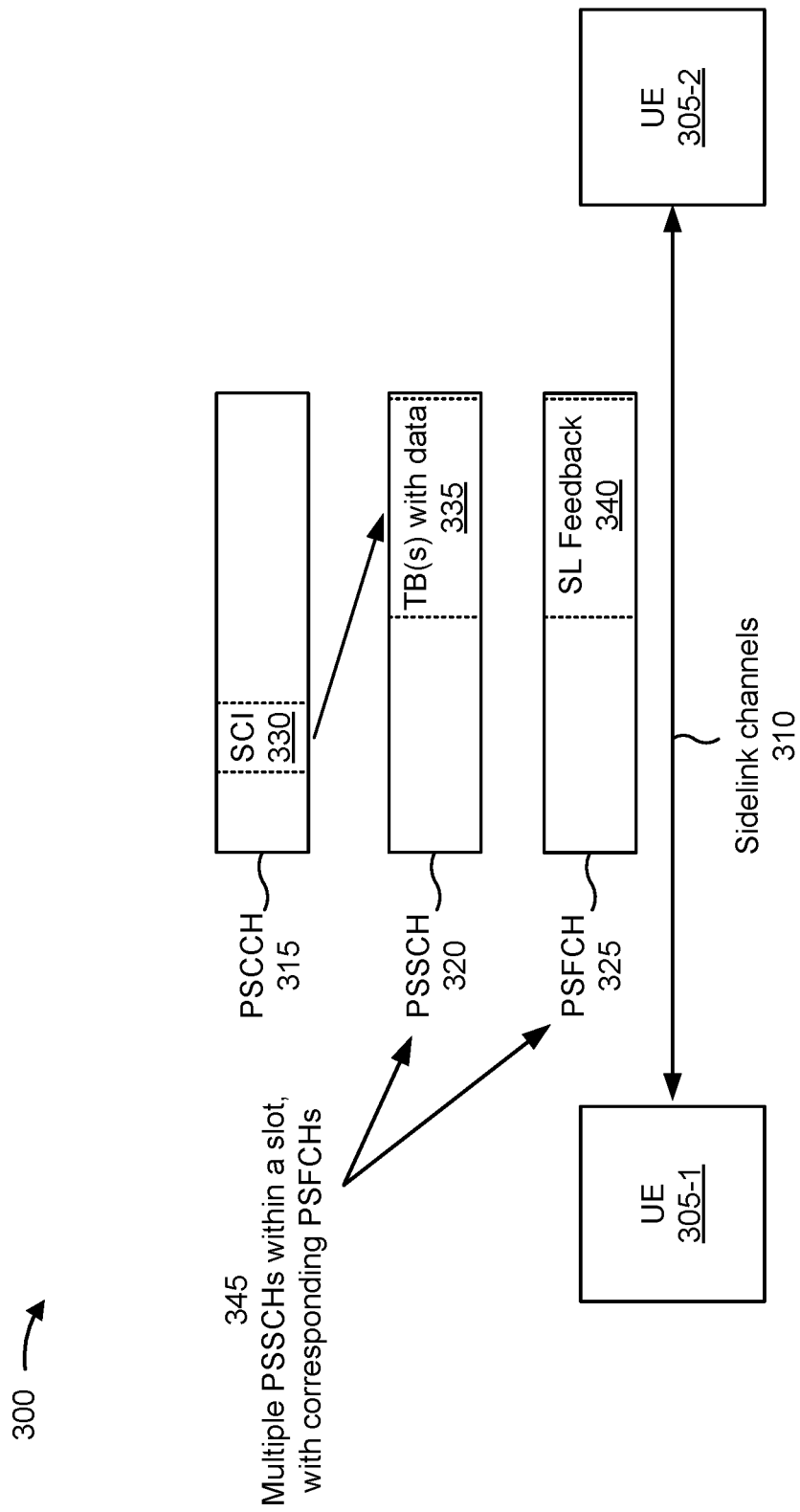
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first-stage SCI (SCI-1) and a second-stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a redundancy version, a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As shown by reference number 345, some techniques and apparatuses described herein enable multiple PSSCHs within a slot. For example, each PSSCH within a slot may occur in a different time interval (e.g., a mini-slot or a set of symbols) within the slot. This may reduce scheduling delays for sidelink data, which may help satisfy requirements for delay-sensitive communications, such as to enable ultra-reliable low latency communication (URLLC). In some aspects, the multiple PSSCHs within a slot may correspond to multiple PSFCHs. This may reduce latency for reporting sidelink feedback, which may further assist with enabling URLLC.

As indicated above, FIG. 3 is provided as an example. Other examples may differ from what is described with respect to FIG. 3.

Figure 4:
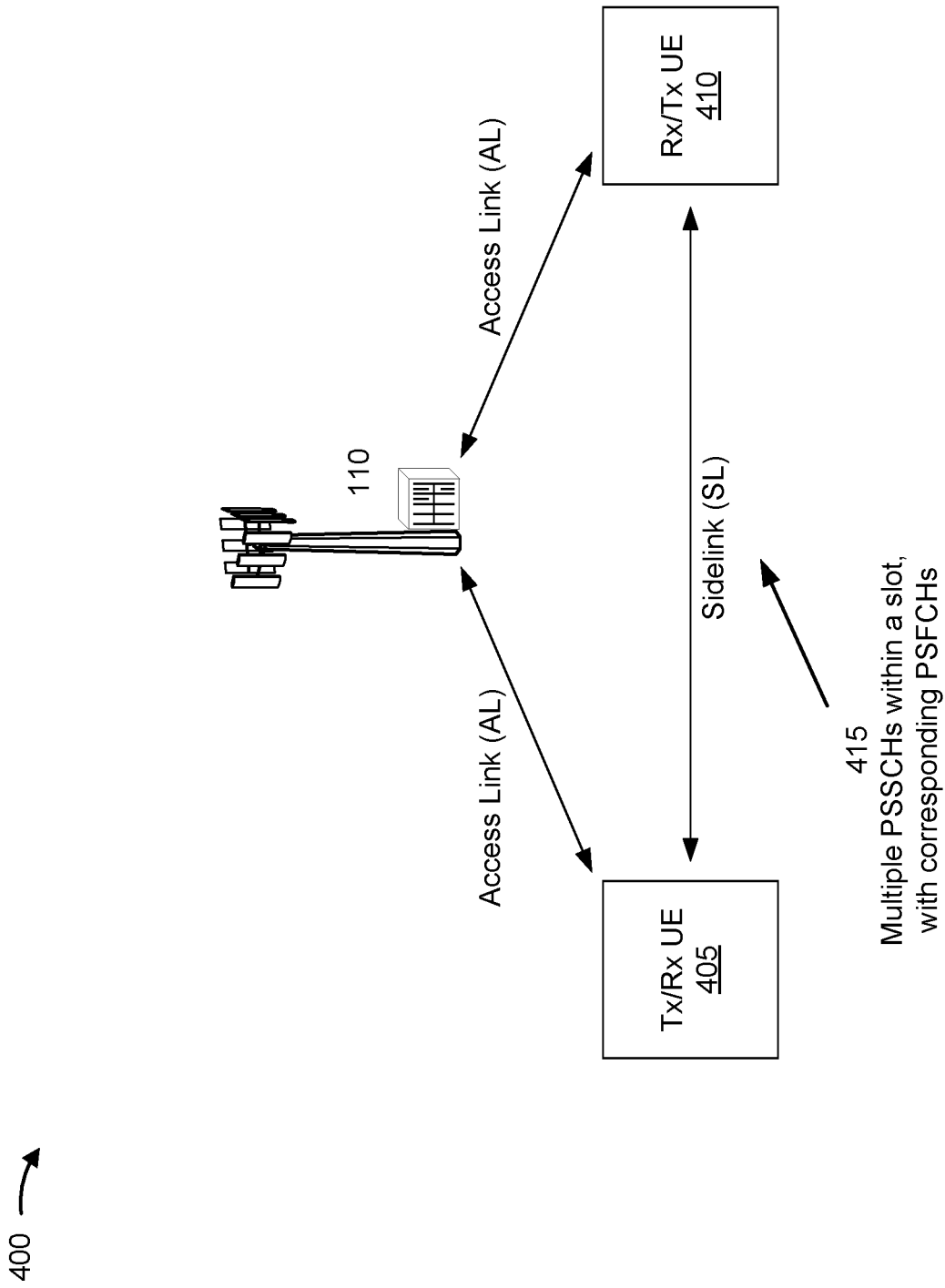
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As shown by reference number 415, some techniques and apparatuses described herein enable multiple PSSCHs within a slot. For example, each PSSCH within a slot may occur in a different time interval (e.g., a mini-slot or a set of symbols) within the slot. This may reduce scheduling delays for sidelink data, which may help satisfy requirements for delay-sensitive communications, such as to enable URLLC. In some aspects, the multiple PSSCHs within a slot may correspond to multiple PSFCHs. This may reduce latency for reporting sidelink feedback, which may further assist with enabling URLLC.

As indicated above, FIG. 4 is provided as an example. Other examples may differ from what is described with respect to FIG. 4.

Figure 5:
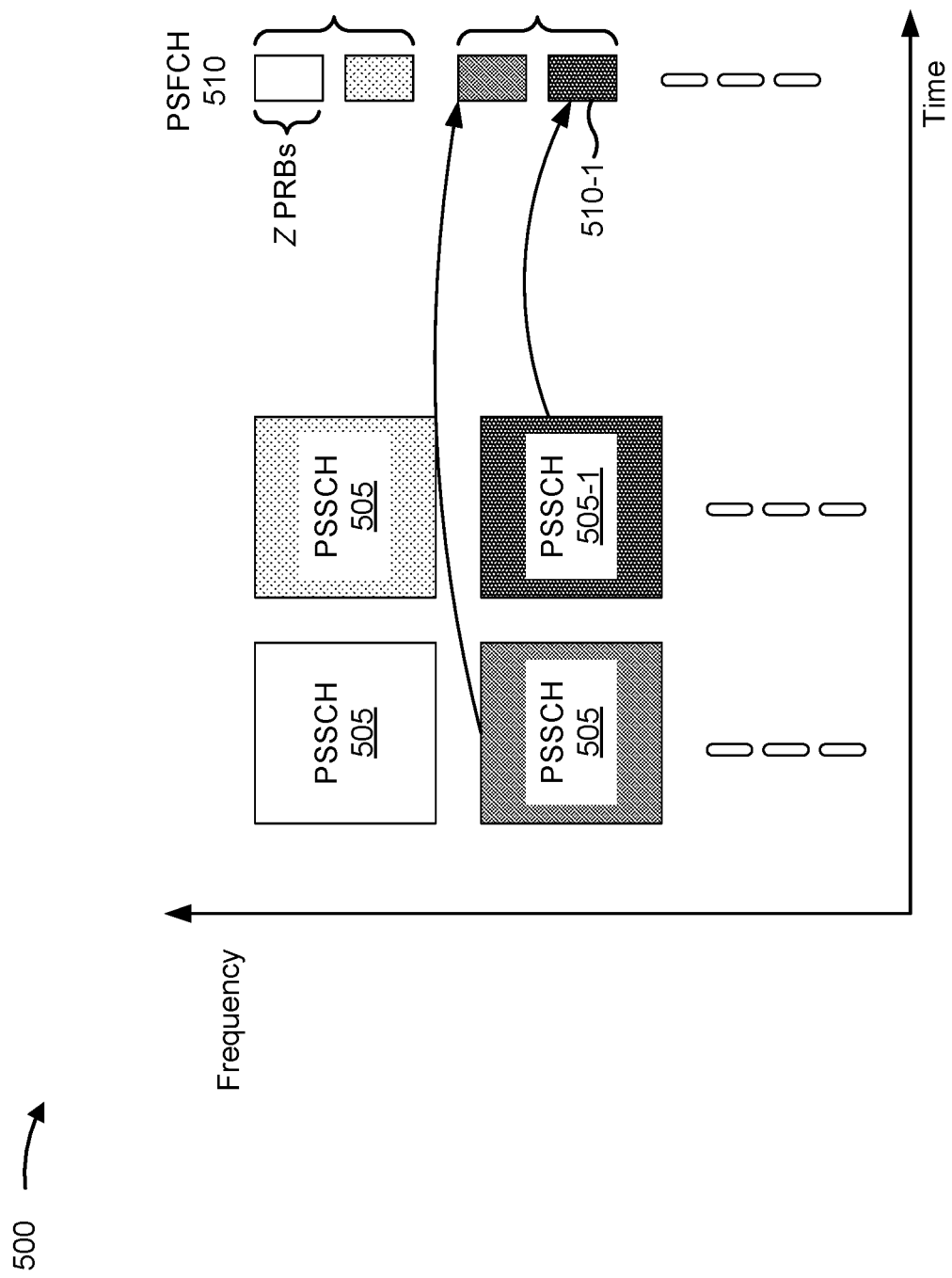
FIG. 5 is a diagram illustrating an example of feedback for sidelink communications, in accordance with the present disclosure.

FIG. 5 is a diagram illustrating an example 500 of feedback for sidelink communications, in accordance with the present disclosure.

As described above in connection with FIG. 3, a PSSCH 505 may be used to communicate data, similar to a PDSCH and/or a PUSCH used for cellular communications with a base station 110 via an access link or an access channel. For example, the PSSCH 505 may carry sidelink data in one or more TBs. As also described above in connection with FIG. 3, a PSFCH 510 may be used to communicate sidelink feedback, such as HARQ feedback (e.g., ACK/NACK information).

As shown in FIG. 5, in some examples, each PSSCH 505 may be mapped to Z physical resource blocks (PRBs) on the PSFCH 510. The Z PRBs can carry Z×Y PSFCH sequences for PSFCH feedback corresponding to the PSSCH 505 that is mapped to the Z PRBs. The value of Y may be selected from a set of {1, 2, 3, 4, 6} that represents a number of cyclic shift pairs (e.g., a dimension in the code domain). When a transmitting UE transmits to a receiving UE via a particular PSSCH, such as PSSCH-505-1, the receiving UE determines one or more PRBs (e.g., Z PRBs) on the PSFCH that are mapped to the PSSCH 505-1, shown as PSFCH 510-1. The receiving UE transmits HARQ feedback on the one or more PRBs, and the transmitting UE monitors the one or more PRBs for the HARQ feedback. Based at least in part on the HARQ feedback, the transmitting UE determines whether to retransmit the data that was transmitted in the PSSCH 505-1.

With this design for sidelink feedback, there may be a delay in HARQ feedback transmission. This delay can be reduced by using sub-slots (e.g., mini-slots or other portions of a slot in the time domain) for HARQ feedback, where each PSSCH 505 is mapped to a sub-slot instead of being mapped to an entire slot. This introduces additional opportunities for HARQ feedback, thereby reducing latency in HARQ feedback transmission. However, there may still be scheduling delay if each PSSCH 505 is required to start at the beginning of a slot.

Some techniques and apparatuses described herein enable sidelink communication using sub-slot-based PSSCHs. For example, a slot may include multiple PSSCHs, each of which may start at a different symbol (e.g., a different time domain resource) within the slot. As a result, latency may be reduced for sidelink communications as compared to a design that includes a single PSSCH per slot and/or that only permits PSSCHs to start at the beginning of a slot. Furthermore, some techniques and apparatuses described herein enable sub-slot-based PSSCHs while accounting for backward compatibility issues and coexistence with adaptive gain control transmissions (which may occur in the initial signal of a slot).

As indicated above, FIG. 5 is provided as an example. Other examples may differ from what is described with respect to FIG. 5.

Figure 6:
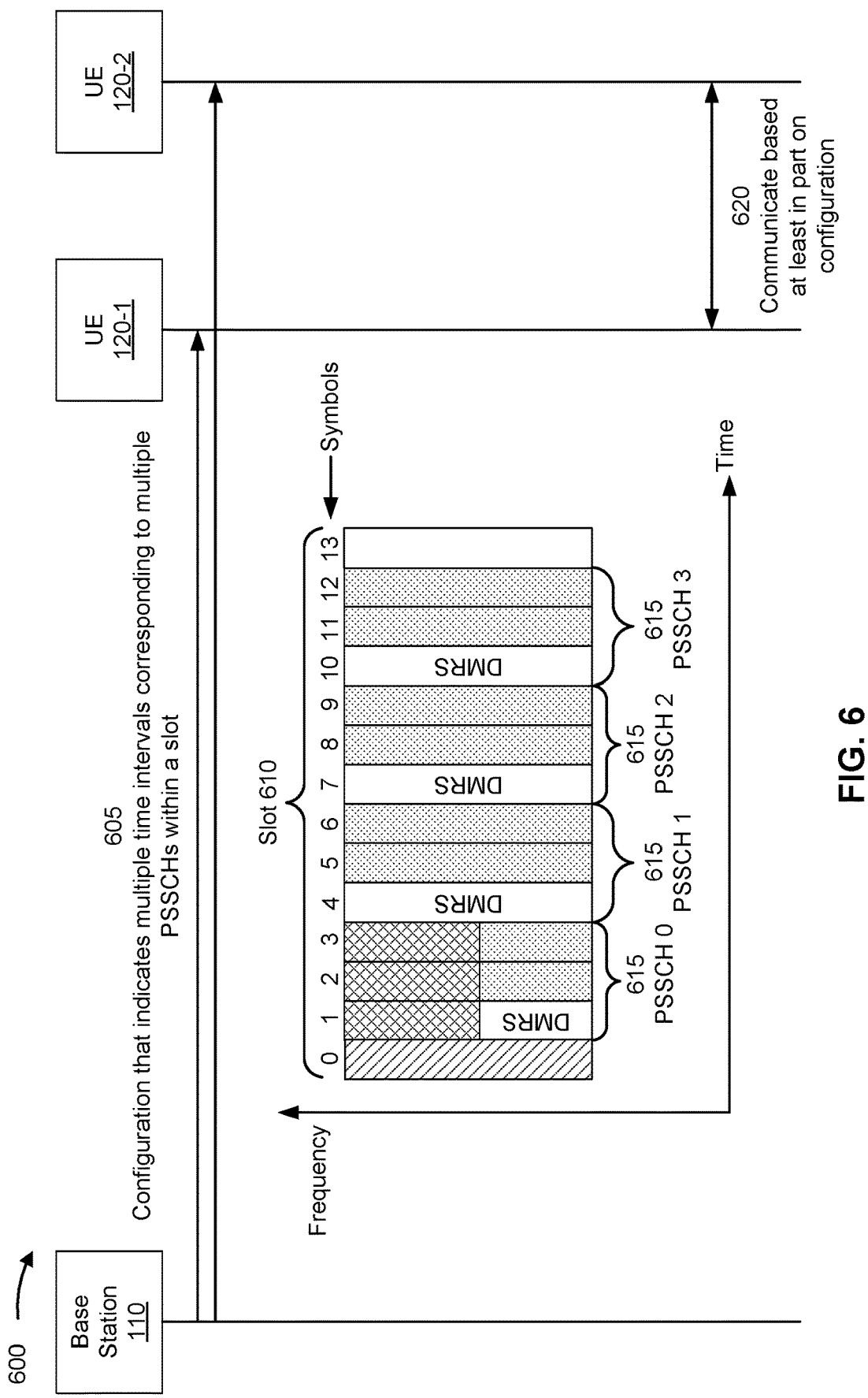
FIGS. 6-10 are diagrams illustrating examples of wireless communication using sub-slot based PSSCHs, in accordance with the present disclosure.

FIG. 6 is a diagram illustrating an example 600 of wireless communication using sub-slot based PSSCHs, in accordance with the present disclosure. As shown in FIG. 6, a base station 110 may communicate with a first UE 120-1 and/or a second UE 120-2. In some aspects, the first UE 120-1 and the second UE 120-2 may communicate with one other using one or more sidelink communications (e.g., in addition to, or in place of, communicating with the base station 110). The base station 110, the first UE 120-1, and the second UE 120-2 may be part of a wireless network (e.g., wireless network 100).

As shown by reference number 605, the base station 110 may transmit, and the first UE 120-1 and the second UE 120-2 may receive, a configuration that indicates multiple time intervals (e.g., multiple sub-slots or multiple portions of a slot) corresponding to multiple PSSCHs within a slot. The term "slot" refers to a time domain resource in wireless communication. A slot may include multiple symbols, which are another time domain resource in wireless communication. A symbol is a portion of a slot. A mini-slot may refer to a portion of a slot that includes multiple symbols. Thus, a slot may be comprised of multiple mini-slots, and each mini-slot may be comprised of multiple symbols. As used herein, a "time interval" that is a portion of a slot may refer to a mini-slot or a set of symbols (e.g., one or more symbols, or multiple symbols). In some aspects, the time domain resources of a slot may be divided into multiple time intervals, and a PSSCH may be configured for and/or allocated to each of the multiple time intervals (or more than one of the multiple time intervals).

In example 600 of FIG. 6, a slot 610 is divided into four mini-slots 615. Each mini-slot 615 includes a PSSCH, shown as PSSCH 0, PSSCH 1, PSSCH 2, and PSSCH 3. Because these PSSCHs have a shorter duration than the entire slot, they may be referred to as "shortened PSSCHs" or "sPSSCHs." In some aspects, at least one PSSCH, of the multiple PSSCHs configured in the slot, starts in a symbol other than an initial data symbol of the slot. For example, in some aspects, at least one PSSCH, of the multiple PSSCHs configured in the slot, starts in a symbol that occurs later than an initial data symbol of the slot. An "initial data symbol" of a slot may refer to the earliest symbol in the slot that carries data and/or a DMRS. In example 600, symbol 1 is the initial data symbol in the slot. As shown, PSSCH 0 (and a corresponding first mini-slot) starts in symbol 1, and PSSCH 1, PSSCH 2, and PSSCH 3 all start later than symbol 1. For example, PSSCH 1 (and a corresponding second mini-slot) starts in symbol 4, PSSCH 2 (and a corresponding third mini-slot) starts in symbol 7, and PSSCH 3 (and a corresponding fourth mini-slot) starts in symbol 10. For example, one or more of the PSSCHs may occur in any of symbols 2 through 12 of a slot (e.g., a slot that includes 14 symbols, as shown in example 600). In some aspects, symbol 0 (e.g., the earliest symbol in the slot) may be a copy of symbol 1. In some aspects, symbol 0 may be used for automatic gain control (AGC). In some aspects, symbol 13 (e.g., the latest symbol in the slot) may be a gap before a next slot.

In some aspects, the configuration may indicate a number (e.g., a quantity) of PSSCHs (or time intervals for PSSCHs) included in the slot (e.g., for all slots or for a set of slots within an indicated time domain allocation, frequency domain allocation, and/or spatial domain allocation). In example 600, the configuration indicates that there are four PSSCHs (and/or four time intervals for PSSCHs) included in the slot.

Additionally, or alternatively, the configuration may indicate a duration (e.g., in the time domain) of one or more PSSCHs of the multiple PSSCHs within the slot. For example, the configuration may indicate a duration of a time interval in which a PSSCH occurs. In some aspects, all of the multiple PSSCHs may have the same duration, as shown in FIG. 6. In this example, the configuration may indicate a single duration that applies to all of PSSCHs in the slot (e.g., 3 symbols in example 600) to conserve signaling overhead.

In some aspects, different PSSCHs (e.g., different time intervals for the PSSCHs) may have different durations. Thus, in some aspects, the configuration may indicate respective durations for every one of the PSSCHs within the slot (e.g., may indicate durations of 3 symbols, 3 symbols, 3 symbols, and 3 symbols in example 600) to enable greater scheduling flexibility. In some aspects, one or more of the PSSCHs may have a duration of at least 2 symbols and less than 7 symbols (e.g., 2, 3, 4, 5, or 6 symbols). Additionally, or alternatively, one or more of the PSSCHs may have a duration greater than or equal to 7 symbols and less than 13 symbols (e.g., 7, 8, 9, 10, 11, or 12 symbols).

Additionally, or alternatively, the configuration may indicate a starting position (e.g., in the time domain) of one or more PSSCHs of the multiple PSSCHs within the slot. In some aspects, the configuration may indicate respective starting positions for every one of the PSSCHs within the slot (e.g., may indicate symbol 1, symbol 4, symbol 7, and symbol 10 in example 600). In some aspects, the configuration may indicate starting position(s) for fewer than all of the multiple PSSCHs within the slot to conserve signaling overhead. For example, the UEs 120 may store information indicating that a PSSCH always starts in the initial data symbol of the slot (e.g., symbol 1 in example 600), and the configuration may exclude an indication that there is a PSSCH that starts in the initial data symbol of the slot. Additionally, or alternatively, the UEs 120 may store information indicating that PSSCHs are always contiguous in the time domain. In this case, the configuration may exclude indications of the starting symbol(s) other than the starting symbol of the earliest-occurring PSSCH in the slot (which may also be excluded, for example, if the earliest-occurring PSSCH starts in the initial data symbol of the slot, as described above). In some aspects, the UEs 120 may store information indicating that PSSCHs are contiguous unless the configuration indicates a starting symbol. In this example, the configuration may indicate only those starting symbols that are not contiguous with an earlier-occurring PSSCH.

In some aspects, one or more of the above sub-slot PSSCH configuration parameters (e.g., a number of PSSCHs included in a slot, a duration of one or more of the PSSCHs, and/or a starting position of one or more of the PSSCHs) may be inferred based at least in part on one or more of the other sub-slot PSSCH configuration parameters. Thus, the configuration may indicate a combination of parameters from which all of the sub-slot PSSCH configuration parameters can be determined, without explicitly indicating all of the sub-slot PSSCH configuration parameters, to conserve signaling overhead.

In some aspects, the configuration may be the same (e.g., may use the same set of sub-slot PSSCH configuration parameters) for all slots. Alternatively, different configurations may be indicated for different sets of slots. For example, the configuration may be specific to a set of slots within indicated time domain resources, within indicated frequency domain resources, and/or within indicated spatial domain resources. Additionally, or alternatively, different configurations may be indicated for slots that include a PSFCH as compared to slots that do not include a PSFCH. Additionally, or alternatively, different configurations may be indicated for slots in which PSSCH communications are scheduled using dedicated grants (e.g., in SCI) as compared to slots in which PSSCH communications are scheduled using a configuration message (e.g., a radio resource control (RRC) message). For example, PSSCH communications may be scheduled using an RRC message for configured grants and/or semi-persistent scheduling.

In some aspects, the multiple PSSCHs may be required to or configured to be contiguous with one another in the time domain. In this example, if multiple PSSCHs are transmitted in a slot, then they are transmitted contiguously (e.g., starting with an initial PSSCH that occurs in an initial data symbol of the slot). This may reduce power variation in a receiver across the slot. However, in some aspects, two or more PSSCHs within the slot may be non-contiguous (e.g., with at least one symbol between them). In some aspects, a PSSCH that occurs in a time interval that is a portion of a slot may not be permitted to or configured to cross a slot boundary because cross-slot PSSCHs may result in a phase discontinuity. Thus, each of the multiple PSSCHs within a slot may be fully contained within the slot (e.g., all symbols of a PSSCH occur within the slot).

As shown in FIG. 6, in some aspects, an initial PSSCH (shown as PSSCH 0), that is scheduled in the initial data symbol of the slot, may include a PSCCH that carries control information. In some aspects, the control information may be used by both UEs 120 that support multiple PSSCHs in a slot and UEs 120 that do not support multiple PSSCHs in a slot. For example, the control information may include one or more legacy parameters that apply to both of these types of UEs 120, which may provide backward compatibility. For example, the PSCCH may carry one or more resource reservation parameters and/or one or more DMRS parameters. In some aspects, the PSCCH may include one or more parameters carried in SCI-1, as described above in connection with FIG. 3.

As further shown in FIG. 6, in some aspects, each PSSCH, of the multiple PSSCHs included in the slot, may include at least one DMRS. In example 600, all of the PSSCHs include a single DMRS. In some aspects, the initial PSSCH in the slot (shown as PSSCH 0) may use a legacy DMRS pattern if a number of symbols included in the initial PSSCH satisfies a threshold. For example, the initial PSSCH may use a legacy DMRS pattern if the initial PSSCH includes 6 or more symbols (or 7 or more symbols). The legacy DMRS pattern may be used and interpretable by both UEs 120 that support multiple PSSCHs in a slot and UEs 120 that do not support multiple PSSCHs in a slot. This may provide backward compatibility with UEs 120 that do not support multiple PSSCHs in a slot. In some aspects, the legacy DMRS pattern includes a DMRS in the first and fifth symbol. In some aspects, the initial PSSCH includes only a single DMRS if a number of symbols included in the initial PSSCH does not satisfy a threshold. The single DMRS may be included in the initial symbol of the initial PSSCH. A DMRS in the initial symbol of a PSSCH may be referred to as a "frontloaded DMRS." In some aspects, the initial PSSCH includes only a frontloaded DMRS if the initial PSSCH includes less than 6 symbols (or less than 7 symbols).

In some aspects, each PSSCH, that starts in a symbol other than the initial data symbol of the slot, includes a DMRS in an initial symbol of that PSSCH. In other words, each PSSCH other than the initial PSSCH may include a frontloaded DMRS. In some aspects, each PSSCH other than the initial PSSCH includes only a frontloaded DMRS. Alternatively, each PSSCH other than the initial PSSCH may include a frontloaded DMRS and one or more other DMRSs, which may be indicated in the configuration (e.g., in an RRC configuration). Thus, the configuration may indicate location(s) of DMRS(s) included in the multiple PSSCHs. In some aspects, a UE may store information indicating that frontloaded DMRS are used for each PSSCH, and the configuration may exclude an indication of frontloaded DMRS for each PSSCH to conserve signaling overhead. Thus, in some aspects, the configuration may indicate only the DMRSs that are not frontloaded DMRSs.

In some aspects, the UEs may receive the configuration information via RRC signaling (e.g., in an RRC configuration message and/or an RRC reconfiguration message) and/or medium access control (MAC) signaling (e.g., MAC control elements (MAC CEs)). Although the UEs 120 are shown as receiving the configuration from the base station 110, in some aspects, one or more UEs 120 may receive the configuration from one or more other UEs 120 (e.g., via PC5-RRC signaling).

As shown by reference number 620, the first UE 120-1 and the second UE 120-2 may communicate based at least in part on the configuration. For example, the first UE 120-1 and the second UE 120-2 may communicate via a sidelink based at least in part on the configuration. In some aspects, the first UE 120-1 and the second UE 120-2 may communicate in one or more PSSCHs, of the multiple PSSCHs configured within the slot, based at least in part on the configuration. In some aspects, the base station 110 may refrain from communicating with the UEs 120 in resources configured for sidelink communications.

For example, the UEs 120 may schedule communications based at least in part on the configuration (e.g., in the indicated PSSCHs), may transmit communications in the indicated PSSCHs, may monitor for communications in the indicated PSSCHs, and/or may receive communications in the indicated PSSCHs. Additionally, or alternatively, the UEs 120 may receive and/or interpret PSSCHs based at least in part on an indicated and/or preconfigured PSSCH. Additionally, or alternatively, the UEs 120 may perform signal processing based at least in part on the indicated DMRSs and/or DMRS patterns.

In this way, the UEs 120 may communicate unambiguously based at least in part on the configuration and may communicate with less scheduling delay due to having multiple PSSCH opportunities within a slot, as compared to having a single PSSCH within the slot. This may reduce latency and enable URLLC.

As indicated above, FIG. 6 is provided as an example. Other examples may differ from what is described with regard to FIG. 6.

Figure 7:
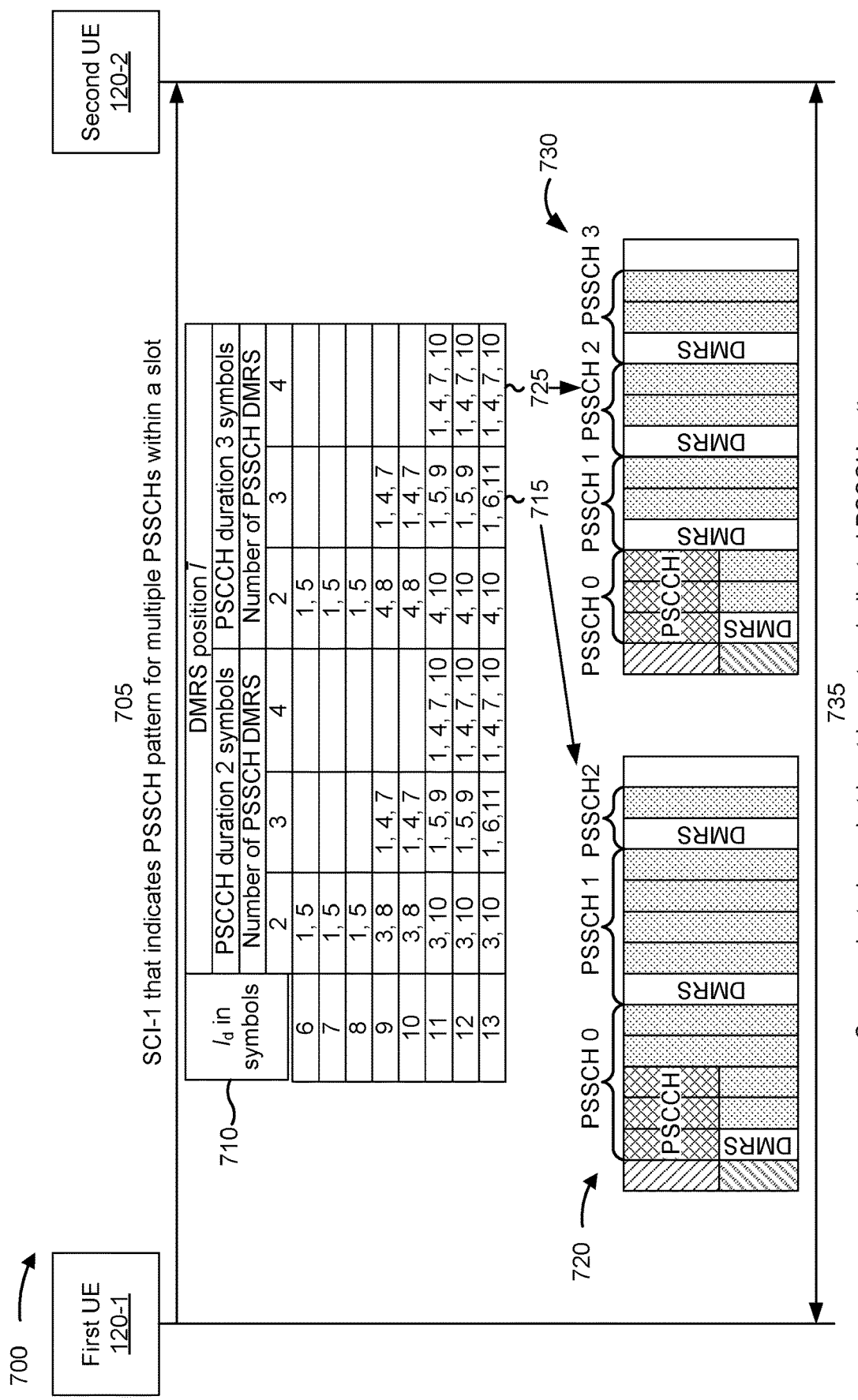

FIG. 7 is a diagram illustrating an example 700 of wireless communication using sub-slot based PSSCHs, in accordance with the present disclosure. As shown in FIG. 7, a first UE 120-1 and a second UE 120-2 may communicate with one another. In some aspects, the first UE 120-1 and the second UE 120-2 may communicate with one other using one or more sidelink communications. The first UE 120-1 and the second UE 120-2 may be part of a wireless network (e.g., wireless network 100).

As shown by reference number 705, the first UE 120-1 may transmit, and the second UE 120-2 may receive, SCI-1 that indicates a PSSCH pattern for multiple PSSCHs within a slot. In some aspects, the multiple PSSCHs may be configured as described above in connection with FIG. 6. In some aspects, the PSSCH pattern is a time domain PSSCH pattern. In some aspects, the PSSCH pattern indicates a number of PSSCHs included in a slot, a duration of one or more of the PSSCHs, and/or a starting position of one or more of the PSSCHs (e.g., one or more of the sub-slot PSSCH configuration parameters described above in connection with FIG. 6). The PSSCH pattern may be dynamically signaled in SCI-1 for a particular slot or set of slots that correspond to and/or are indicated in the SCI-1. For example, the SCI-1 may indicate a PSSCH pattern for the slot in which the SCI-1 occurs. In this way, multiple PSSCHs within a slot can be flexibly scheduled across different slots, which may enable accommodation of different latency requirements for different slots and/or data transmissions.

In some aspects, a configuration (e.g., the configuration described above in connection with FIG. 6) may indicate multiple PSSCH patterns, and the SCI-1 may indicate a PSSCH pattern of the multiple PSSCH patterns. For example, the configuration may indicate a set of index values corresponding to a set of PSSCH patterns. The SCI-1 may indicate an index value, of the set of index values, that corresponds to a PSSCH pattern of the set of PSSCH patterns. In this way, signaling overhead in SCI-1 may be reduced as compared to indicating details of the PSSCH pattern in the SCI-1.

In some aspects, the SCI-1 may indicate the PSSCH pattern using a DMRS pattern (e.g., one or more DMRS pattern parameters) indicated in the SCI-1 and/or using a DMRS pattern field or fields included in the SCI-1. For example, as shown by reference number 710, a value included in SCI-1 may indicate multiple DMRS positions for a slot. A "DMRS position" may refer to a time domain resource (e.g., a symbol) that includes a DMRS.

For example, if a slot includes a PSCCH configured with a duration of 3 symbols and there are 3 PSSCH DMRSs configured for the slot, then a value of 13 indicated in a DMRS pattern field in the SCI-1 for the slot may indicate that there are DMRSs in symbols 1, 6, and 11 of the slot, as shown by reference number 715. This may indicate that PSSCHs (and corresponding time intervals) start in symbols 1, 6, and 11 of the slot, as shown by reference number 720. In some aspects, for contiguous PSSCHs and only front-loaded DMRSs, this may also indicate a duration of 5 symbols, 5 symbols, and 2 symbols, respectively for 3 PSSCHs included in the slot.

In the same scenario, a value of 14 indicated in a DMRS pattern field in the SCI-1 for the slot may indicate that there are DMRSs in symbols 1, 4, 7, and 10 of the slot, as shown by reference number 725. This may indicate that PSSCHs (and corresponding time intervals) start in symbols 1, 4, 7, and 10 of the slot, as shown by reference number 730. In some aspects, for contiguous PSSCHs and only frontloaded DMRSs, this may also indicate a duration of 3 symbols for each of the PSSCHs included in the slot. Reusing information in a DMRS pattern field to indicated PSSCH pattern may conserve signaling overhead as compared to separate indications of a DMRS pattern and a PSCCH pattern.

In some aspects, the value of $I_d$, shown in FIG. 7 (and which may be indicated in the SCI-1), may indicate a total duration of all PSSCHs in the slot, when combined. In some aspects, the number of PSSCHs included in the slot is based at least in part on (e.g., may be the same as) the number of DMRSs indicated in SCI-1. Additionally, or alternatively, the starting position (e.g., in the time domain) of each of the PSSCHs within the slot may be based at least in part on (e.g., may be the same as) the DMRS positions indicated in SCI-1. In some aspects, when the DMRS pattern field is used to indicate a PSSCH pattern, the first UE 120-1 may be required to indicate a DMRs pattern that includes DMRS in an initial data symbol of the slot. For example, the first UE 120-1 may be required to indicate a DMRS pattern of {1, 5}, {1, 4, 7}, {1, 5, 9}, {1, 6, 11}, or {1, 4, 7, 10}, and may not be permitted to indicate a DMRS pattern of {3, 8}, {3, 10}, {4, 8}, or {4, 10}.

As shown by reference number 735, the first UE 120-1 and the second UE 120-2 may communicate based at least in part on the indicated PSSCH pattern. For example, the first UE 120-1 and the second UE 120-2 may communicate via a sidelink based at least in part on the PSSCH pattern. In some aspects, the first UE 120-1 and the second UE 120-2 may communicate in one or more PSSCHs indicated by the PSSCH pattern.

By dynamically signaling a PSSCH pattern for multiple PSSCHs included in a slot, the PSSCH pattern can be flexibly configured according to requirements of data transmissions in that slot.

As indicated above, FIG. 7 is provided as an example. Other examples may differ from what is described with regard to FIG. 7.

Figure 8:
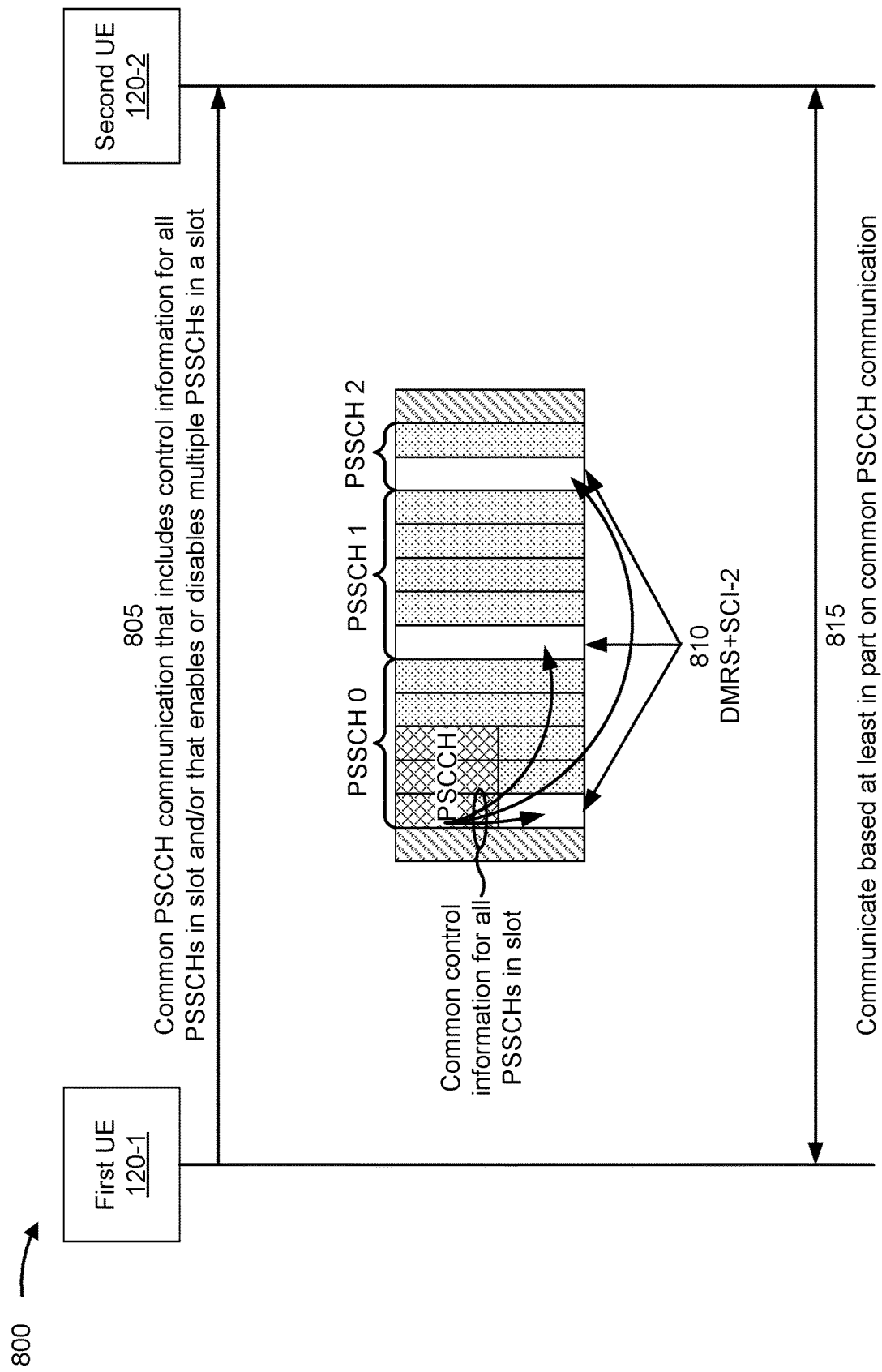

FIG. 8 is a diagram illustrating an example 800 of wireless communication using sub-slot based PSSCHs, in accordance with the present disclosure. As shown in FIG. 8, a first UE 120-1 and a second UE 120-2 may communicate with one another. In some aspects, the first UE 120-1 and the second UE 120-2 may communicate with one other using one or more sidelink communications. The first UE 120-1 and the second UE 120-2 may be part of a wireless network (e.g., wireless network 100).

As shown by reference number 805, the first UE 120-1 may transmit, and the second UE 120-2 may receive, a PSCCH communication, in a slot, that includes control information applicable to all PSSCHs in the slot. A PSCCH communication that includes control information applicable to all PSSCHs in the slot may be referred to herein as a "common PSSCH communication." In some aspects, the PSCCH is included in the initial PSSCH in the slot, as shown in FIG. 8.

In some aspects, the control information may include a resource reservation for all PSSCHs in the slot (e.g., a "common resource reservation"). For example, the control information may indicate a time domain resource allocation and/or a frequency domain resource allocation for all PSSCHs in the slot. Additionally, or alternatively, the control information may indicate a single priority (e.g., a priority level) associated with all PSSCHs in the slot. In some aspects, the single priority may be based at least in part on a set of priorities associated with a corresponding set of transport blocks carried in the PSSCHs. For example, the first UE 120-1 may set the single priority as the highest priority across the set of priorities, or the first UE 120-1 may set the single priority as the lowest priority across the set of priorities. Additionally, or alternatively, the control information may indicate a single format for SCI-2 for each of the PSSCHs. For example, as shown by reference number 810, an initial symbol of each PSSCH may carry a DMRS and/or SCI-2. The common control information may indicate a format for all of the SCI-2.

In some aspects, the SCI-1 (e.g., carried in the PSCCH communication) may include an indication of whether multiple PSSCHs are enabled or disabled for the slot. In some aspects, the indication may be a single bit in a field that indicates whether the slot includes multiple PSSCHs. Additionally, or alternatively, the indication may be a value of a field that indicates a PSSCH pattern, with one of the values indicating that multiple PSSCHs are disabled for the slot (e.g., that the slot includes a single PSSCH). As a result, a receiving UE may conserve UE resources (e.g., memory resources, processing resources, and/or battery power) that would otherwise be used for blind decoding of SCI-2 in each PSSCH.

As shown by reference number 815, the first UE 120-1 and the second UE 120-2 may communicate based at least in part on the common PSCCH communication. For example, the first UE 120-1 and the second UE 120-2 may communicate via a sidelink based at least in part on the common PSCCH communication. In some aspects, the first UE 120-1 and the second UE 120-2 may communicate, may interpret, and/or may decode one or more PSSCHs according to a resource reservation indicated in the common PSCCH communication, a priority indicated in the PSCCH communication, and/or an SCI-2 format indicated in the common PSCCH communication. By using a common PSCCH communication for all PSSCHs in the slot, backward compatibility may be achieved.

As indicated above, FIG. 8 is provided as an example. Other examples may differ from what is described with regard to FIG. 8.

Figure 9:
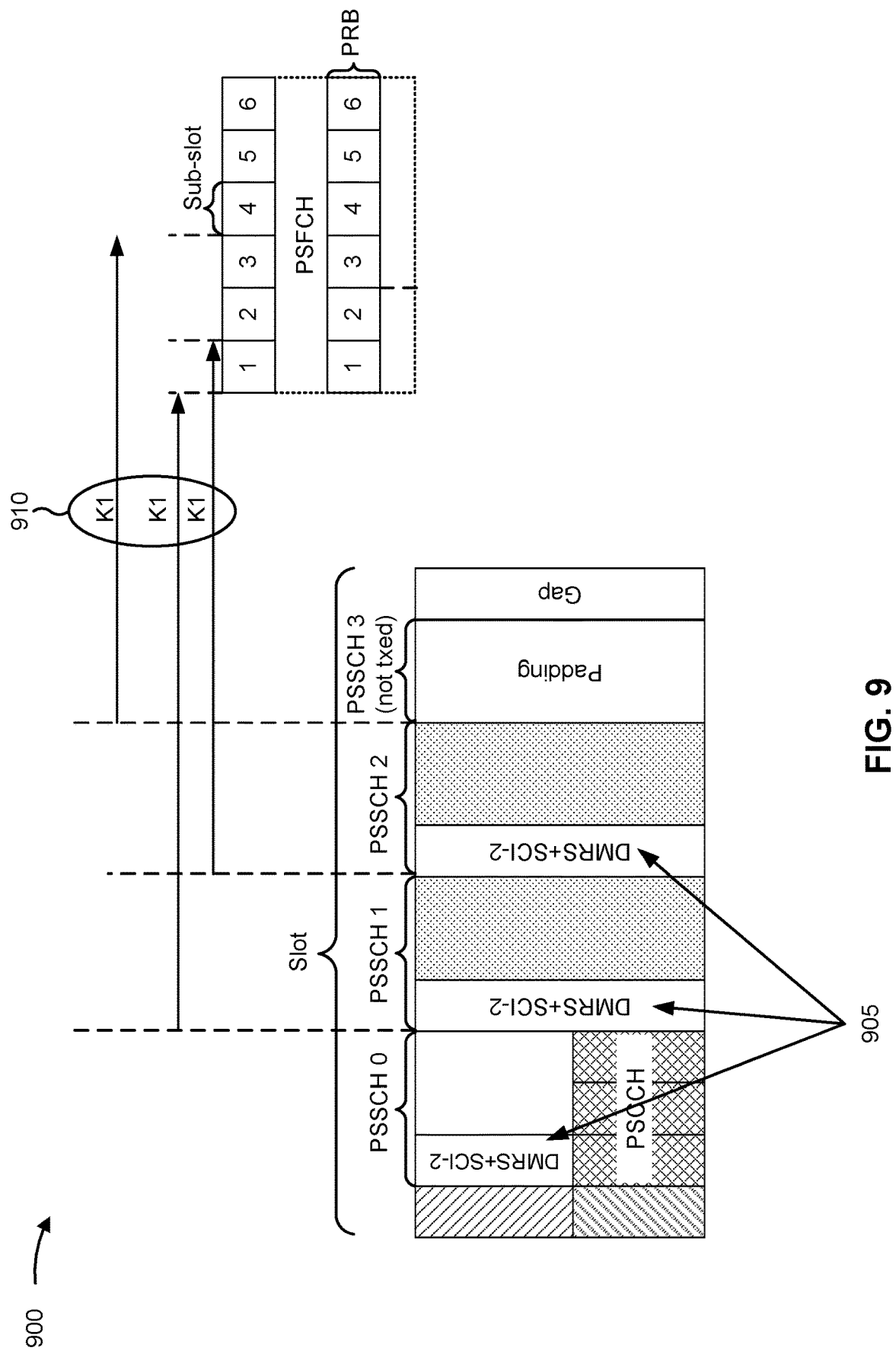

FIG. 9 is a diagram illustrating an example 900 of wireless communication using sub-slot based PSSCHs, in accordance with the present disclosure. In example 900, a slot is divided into 4 sub-slots that each carry a PSSCH, shown as PSSCH 0, PSSCH 1, PSSCH 2, and PSSCH 3.

As shown by reference number 905, in some aspects, each PSSCH may include SCI-2 that carries control information for that PSSCH. In some aspects, the SCI-2 is included in an initial symbol of a corresponding PSSCH. For example, PSSCH 0 includes, in an initial symbol of PSSCH 0, SCI-2 that carries control information specific to PSSCH 0. Similarly, PSSCH 1 includes, in an initial symbol of PSSCH 1, SCI-2 that carries control information specific to PSSCH 1, and likewise for PSSCH 2. In example 900, PSSCH 3 is not transmitted, and there is not SCI-2 transmitted for PSSCH 3. As shown, each PSSCH (e.g., PSSCH 0, PSSCH 1, and PSSCH 2) may also include front-loaded DMRS, as described elsewhere herein. In some aspects, the SCI-2 is carried in a single symbol (e.g., the initial symbol of a corresponding PSSCH). In some aspects, the SCI-2 spans multiple symbols and begins in the initial symbol of a corresponding PSSCH.

In some aspects, the SCI-2 may include information associated with data transmissions on a corresponding PSSCH (e.g., a PSSCH that includes the SCI-2), such as a HARQ process ID for the PSSCH, an NDI for the PSSCH, a redundancy version for the PSSCH, a source identifier for the PSSCH, a destination identifier for the PSSCH, and/or a CSI report trigger for the PSSCH. In some aspects, a receiving UE may blindly decode each SCI-2 to see if the destination ID, indicated in that SCI-2, matches a destination ID of the receiving UE. If there is a match, then the receiving UE may decode the PSSCH corresponding to the SCI-2. Otherwise, the receiving UE may skip decoding to save UE resources (e.g., processing resources, memory resources, and/or battery power).

Additionally, or alternatively, the SCI-2 may indicate one or more resources for transmission of HARQ feedback (e.g., ACK/NACK feedback or ACK/NACK information) associated with a corresponding PSSCH. For example, as shown by reference number 910, the SCI-2 for a PSSCH may indicate a K1 value that indicates an offset between the PSSCH (e.g., a starting symbol of the PSSCH or an ending symbol of the PSSCH) and a corresponding PSFCH resource (e.g., a time domain resource) in which HARQ feedback, corresponding to the PSSCH, is to be transmitted. In some aspects, the offset is indicated as a number of symbols to enable greater scheduling flexibility and reduced latency as compared to signaling a slot for the HARQ feedback. Additionally, or alternatively, the SCI-2 may indicate a resource index for the PSFCH (e.g., a time domain resource index, a frequency domain resource index, and/or a PRB index).

Additionally, or alternatively, the SCI-2 may indicate an MCS for a corresponding PSSCH. For example, the SCI-2 may include an MCS index that indicates an MCS used for the data bits transmitted in a PSSCH corresponding to the SCI-2. In some examples, the MCS used for a PSSCH may not be known at a time when the PSCCH is transmitted (e.g., at the beginning of the slot). Thus, by transmitting SCI-2 for each PSSCH, a more accurate and appropriate MCS can be indicated and used per PSSCH. In some aspects, SCI-1 (e.g., in the PSCCH) may indicate a common MCS for all PSSCHs in the slot, and each SCI-2 may indicate a per-PSSCH MCS (e.g., a specific MCS) that overrides the common MCS. A receiving UE may use the per-PSSCH MCS, indicated in a particular PSSCH, to demodulate and/or decode the particular PSSCH.

In some aspects, the common MCS may be used for rate matching of resource elements. For example, the common MCS may be used to determine a coding rate R, which may be used to calculate a number of resource elements to be rate matched for SCI-2, as shown in the equation below. In some aspects, the common MCS may be used only for determining the number of SCI-2 resource elements to be rated matched within the PSSCH, and a per-PSSCH MCS indicated in the SCI-2 may be used for demodulation and/or decoding of the PSSCH, as described above.

Additionally, or alternatively, the SCI-1 transmitted in a slot (e.g., in a common PSCCH) may indicate one or more values of a rate matching parameter to be used for the SCI-2s within the slot. In some aspects, the rate matching parameter may be a beta offset value, sometimes represented as $\beta_{offset}^{SCI2}$. The beta offset value may be used as part of a calculation to determine a number of resource elements to be rate matched for SCI-2, represented as $Q'_{SCI2}$ below.

$$Q'_{SCI2} = \min\left\{\left\lceil \frac{(O_{SCI2} + L_{SCI2}) \cdot \beta_{offset}^{SCI2}}{Q_m^{SCI2} \cdot R} \right\rceil, \left\lceil \alpha \sum_{l=0}^{N_{symbol}^{rPSSCH}-1} M_{sc}^{SCI2}(l) \right\rceil\right\} \gamma$$

In some aspects, the SCI-1 may indicate different values of the rate matching parameter for different SCI-2s in the slot. For example, the SCI-1 may include a field (e.g., a beta offset field) corresponding to each SCI-2 included in the slot and/or corresponding to each PSSCH included in the slot. In other words, the number of fields for the rate matching parameter (e.g., the number of beta offset fields) may be equal to the number of SCI-2s included in the slot and/or the number of PSSCHs included in the slot. This provides greater flexibility in rate matching for different SCI-2s as compared to a single value of the rate matching parameter for all SCI-2s in the slot.

In some aspects, the SCI-1 may indicate a single value (e.g., a common value) of the rate matching parameter, and the single value may be used for every SCI-2 in the slot. For example, the SCI-1 may include a single field (e.g., a single beta offset field) that is used to indicate the same rate matching parameter (e.g., the same beta offset value) for all SCI-2s included in the slot. In some aspects, the SCI-1 indicates a most conservative beta offset value for a set of receiving UEs to which the SCI-1 is transmitted. For example, a transmitting UE may determine a set of pathloss values corresponding to the set of receiving UEs, may identify a worst pathloss value (e.g., corresponding to the largest pathloss) among the set of pathloss values, and may select a beta offset value based at least in part on the worst pathloss value. In some aspects, if a single beta offset value is indicated for all receiving UEs, then the transmitting UE may group receiving UEs associated with a similar level of beta offset (e.g., above a threshold, below a threshold, or between two thresholds), and may transmit to that group of UEs within a particular slot. In some aspects, the transmitting UE may transmit to receiving UEs associated with different levels of beta offset in different slots so that different beta offset values can be indicated in respective SCI-1s of different slots.

In some aspects, the SCI-2 resource elements to be rate matched in the PSSCH may be mapped to one or more starting symbols of the PSSCH. For example, the SCI-2 resource elements may be mapped to the initial symbol of the PSSCH and/or may be mapped to multiple contiguous symbols that start at the beginning of the PSSCH. In some aspects, the SCI-2 may be mapped to vacant resource elements of one or more symbols starting from an initial symbol in a frequency first, time second manner. In some aspects, one or more SCI-2 resource elements may be mapped to a front-loaded DMRS symbol of the PSSCH. In some aspects, a DMRS, a channel state information reference signal (CSI-RS), a phase tracking reference signal (PTRS), and/or a PSCCH may be excluded from the mapping.

As indicated above, FIG. 9 is provided as an example. Other examples may differ from what is described with regard to FIG. 9.

Figure 10:
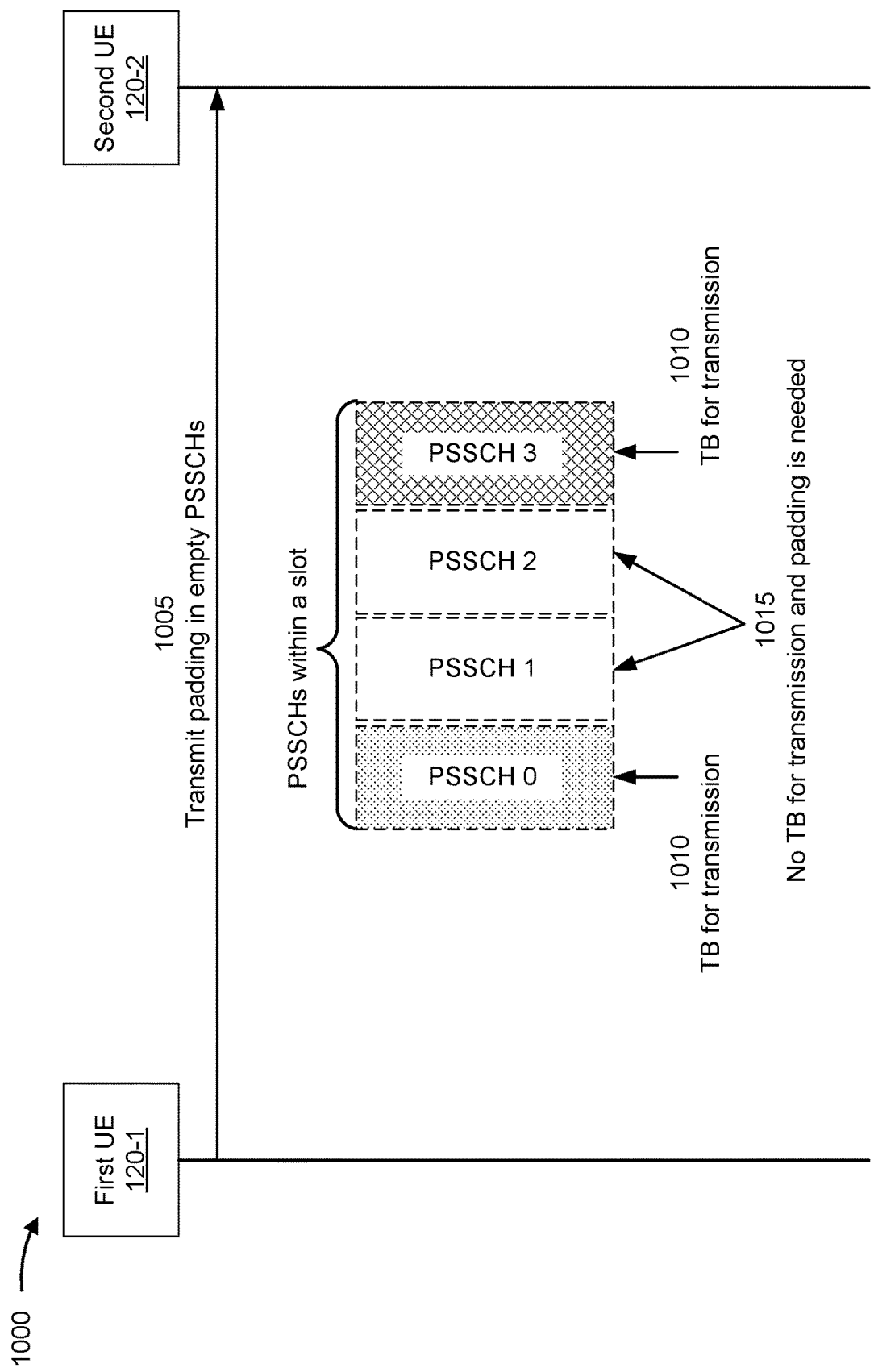

FIG. 10 is a diagram illustrating an example 1000 of wireless communication using sub-slot based PSSCHs, in accordance with the present disclosure. In example 1000, a slot is divided into 4 sub-slots that each carry a PSSCH, shown as PSSCH 0, PSSCH 1, PSSCH 2, and PSSCH 3.

As shown by reference number 1005, when a transmitting UE (e.g., a first UE 120-1) transmits a TB in one or more PSSCHs within a slot but in fewer than all of the PSSCHs within the slot, then the transmitting UE may transmit padding in the empty PSSCHs. An "empty PSSCH" may include a PSSCH that is not scheduled for a data transmission and/or a PSSCH that does not carry a TB or that is not used for transmission of a TB.

As shown by reference number 1010, in example 1000, data transmissions by the transmitting UE are scheduled in PSSCH 0 and PSSCH 3 within a slot. Accordingly, the transmitting UE transmits a TB in PSSCH 0 and transmits a TB in PSSCH 3. As shown by reference number 1015, data transmissions by the transmitting UE are not scheduled in PSSCH 1 and PSSCH 2. In this scenario, the transmitting UE would not normally transmit in PSSCH 1 and in PSSCH 2. However, if the transmitting UE transmits in only a portion of the slot, then this may cause power variation and may disrupt proper reception of the PSSCHs in the slot by the receiving UE (e.g., the second UE 120-2). To reduce power variation, the transmitting UE may transmit padding in PSSCH 1 and PSSCH 2. In some aspects, the padding may include a reference signal, which may be used to improve data reception. Additionally, or alternatively, the padding within a PSSCH may include a repetition of a different PSSCH, within the slot, in which the transmitting UE is scheduled to transmit. The repetition may be the same redundancy version or a different redundancy version than the other PSSCH. In this way, the likelihood of successful reception of the PSSCH can be improved.

In some aspects, the transmitting UE may be configured or required to transmit padding in all empty PSSCHs within a slot if the transmitting UE transmits in any PSSCHs in the slot, thereby reducing power variation. In some aspects, if the transmitting UE determines that no TBs will be transmitted in a slot, then the transmitting UE may refrain from transmitting any TBs and may also refrain from transmitting any padding the slot. In some examples, the transmitting UE may not be capable of making this determination in advance of the slot. In this example, the transmitting UE may transmit padding in all empty PSSCHs regardless of whether any PSSCHs in the slot include a TB. This may reduce power variation.

As indicated above, FIG. 10 is provided as an example. Other examples may differ from what is described with regard to FIG. 10.

Figure 11:
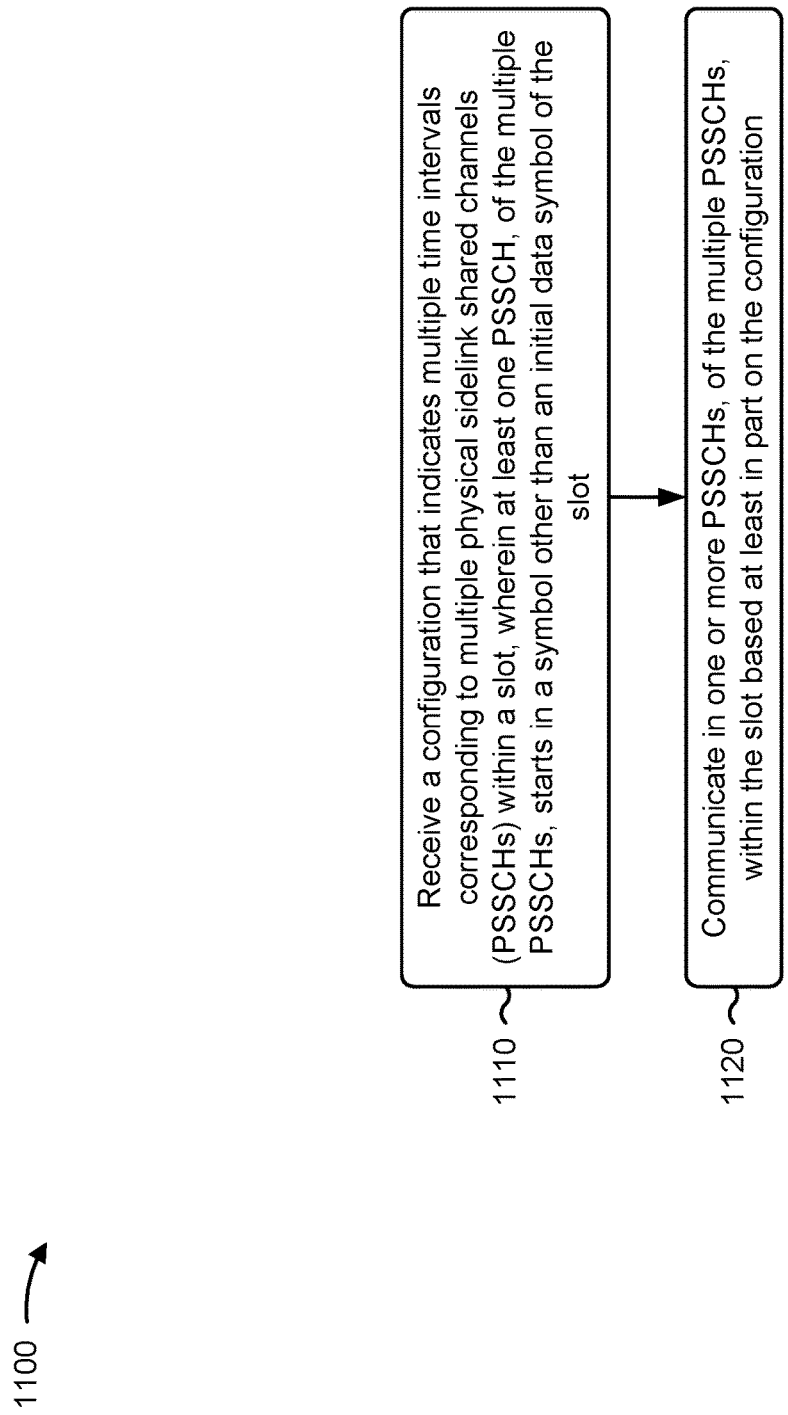
FIGS. 11-12 are diagrams illustrating example processes associated with wireless communication using sub-slot based PSSCHs, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with wireless communication using sub-slot based physical sidelink shared channels.

As shown in FIG. 11, in some aspects, process 1100 may include receiving a configuration that indicates multiple time intervals corresponding to multiple PSSCHs within a slot, wherein at least one PSSCH, of the multiple PSSCHs, starts in a symbol other than an initial data symbol of the slot (block 1110). For example, the UE (e.g., using communication manager 140 and/or reception component 1302, depicted in FIG. 13) may receive a configuration that indicates multiple time intervals corresponding to multiple PSSCHs within a slot, wherein at least one PSSCH, of the multiple PSSCHs, starts in a symbol other than an initial data symbol of the slot, as described above.

As further shown in FIG. 11, in some aspects, process 1100 may include communicating in one or more PSSCHs, of the multiple PSSCHs, within the slot based at least in part on the configuration (block 1120). For example, the UE (e.g., using communication manager 140, reception component 1302 and/or transmission component 1304, depicted in FIG. 13) may communicate in one or more PSSCHs, of the multiple PSSCHs, within the slot based at least in part on the configuration, as described above.

Process 1100 may include additional aspects, such as any single aspect or any combination of aspects described below and/or in connection with one or more other processes described elsewhere herein.

In a first aspect, the configuration indicates at least one of a number of PSSCHs included in the slot; a starting position of one or more PSSCHs, of the multiple PSSCHs, within the slot; or a duration of one or more PSSCHs, of the multiple PSSCHs, within the slot.

In a second aspect, alone or in combination with the first aspect, the multiple PSSCHs are contiguous within the slot.

In a third aspect, alone or in combination with one or more of the first and second aspects, an initial PSSCH, scheduled in the initial data symbol of the slot, includes a physical sidelink control channel.

In a fourth aspect, alone or in combination with one or more of the first through third aspects, each PSSCH, of the multiple PSSCHs, is fully contained within the slot and does not cross a slot boundary.

In a fifth aspect, alone or in combination with one or more of the first through fourth aspects, each PSSCH, of the multiple PSSCHs, includes at least one demodulation reference signal.

In a sixth aspect, alone or in combination with one or more of the first through fifth aspects, an initial PSSCH, scheduled in the initial data symbol of the slot, uses a legacy demodulation reference symbol pattern if a number of symbols included in the initial PSSCH satisfies a threshold.

In a seventh aspect, alone or in combination with one or more of the first through sixth aspects, an initial PSSCH, scheduled in the initial data symbol of the slot, includes a single demodulation reference signal in the initial data symbol if a number of symbols included in the initial PSSCH does not satisfy a threshold.

In an eighth aspect, alone or in combination with one or more of the first through seventh aspects, each PSSCH, that starts in a symbol other than the initial data symbol of the slot, includes a demodulation reference signal in an initial symbol of that PSSCH.

In a ninth aspect, alone or in combination with one or more of the first through eighth aspects, the configuration indicates a location of one or more demodulation reference signals within one or more PSSCHs of the multiple PSSCHs.

In a tenth aspect, alone or in combination with one or more of the first through ninth aspects, process 1100 includes receiving SCI-1 that indicates a PSSCH pattern in a time domain for the multiple PSSCHs.

In an eleventh aspect, alone or in combination with one or more of the first through tenth aspects, the configuration indicates multiple PSSCH patterns, and wherein the SCI-1 includes an index that identifies the PSSCH pattern from the multiple PSSCH patterns.

In a twelfth aspect, alone or in combination with one or more of the first through eleventh aspects, the PSSCH pattern is indicated via a demodulation reference signal pattern indicated in the SCI-1.

In a thirteenth aspect, alone or in combination with one or more of the first through twelfth aspects, process 1100 includes receiving a PSCCH communication that includes control information applicable to all of the PSSCHs in the slot.

In a fourteenth aspect, alone or in combination with one or more of the first through thirteenth aspects, the PSCCH communication indicates at least one of a common resource reservation for all PSSCHs in the slot, a priority associated with all PSSCHs in the slot, or a second-stage sidelink control information format for all PSSCHs in the slot.

In a fifteenth aspect, alone or in combination with one or more of the first through fourteenth aspects, process 1100 includes receiving first-stage sidelink control information that indicates whether the multiple PSSCHs are enabled or disabled for the slot.

In a sixteenth aspect, alone or in combination with one or more of the first through fifteenth aspects, each PSSCH, of the multiple PSSCHs, includes, in an initial symbol of that PSSCH, SCI-2 for that PSSCH.

In a seventeenth aspect, alone or in combination with one or more of the first through sixteenth aspects, the SCI-2 indicates at least one of a modulation and coding scheme for a corresponding PSSCH, or one or more resources for transmission of acknowledgement or negative acknowledgement feedback associated with the corresponding PSSCH.

In an eighteenth aspect, alone or in combination with one or more of the first through seventeenth aspects, process 1100 includes receiving first-stage sidelink control information that indicates a common modulation and coding scheme for all PSSCHs in the slot, and overriding the common modulation and coding scheme for a particular PSSCH with a per-PSSCH modulation and coding scheme indicated in SCI-2 corresponding to the particular PSSCH.

In a nineteenth aspect, alone or in combination with one or more of the first through eighteenth aspects, process 1100 includes receiving SCI-1 that indicates one or more values of a rate matching parameter for multiple SCI-2 corresponding to the multiple PSSCHs within the slot.

In a twentieth aspect, alone or in combination with one or more of the first through nineteenth aspects, the SCI-1 indicates different values of the rate matching parameter for different PSSCHs within the slot.

In a twenty-first aspect, alone or in combination with one or more of the first through twentieth aspects, the SCI-1 indicates a common value of the rate matching parameter for all PSSCHs within the slot.

In a twenty-second aspect, alone or in combination with one or more of the first through twenty-first aspects, a common modulation and coding scheme, indicated in first-stage sidelink control information for all PSSCHs within the slot, is used to determine resource elements for a particular SCI-2 for rate matching of resource elements for a PSSCH corresponding to the particular SCI-2.

In a twenty-third aspect, alone or in combination with one or more of the first through twenty-second aspects, one or more symbols of a particular SCI-2 are mapped to demodulation reference signal symbols that occur at a beginning of a PSSCH corresponding to the particular SCI-2.

In a twenty-fourth aspect, alone or in combination with one or more of the first through twenty-third aspects, communication in the one or more PSSCHs comprises transmitting data in a first PSSCH, of the one or more PSSCHs, in which a data transmission is scheduled, and transmitting padding in a second PSSCH, of the one or more PSSCHs, in which a data transmission is not scheduled.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
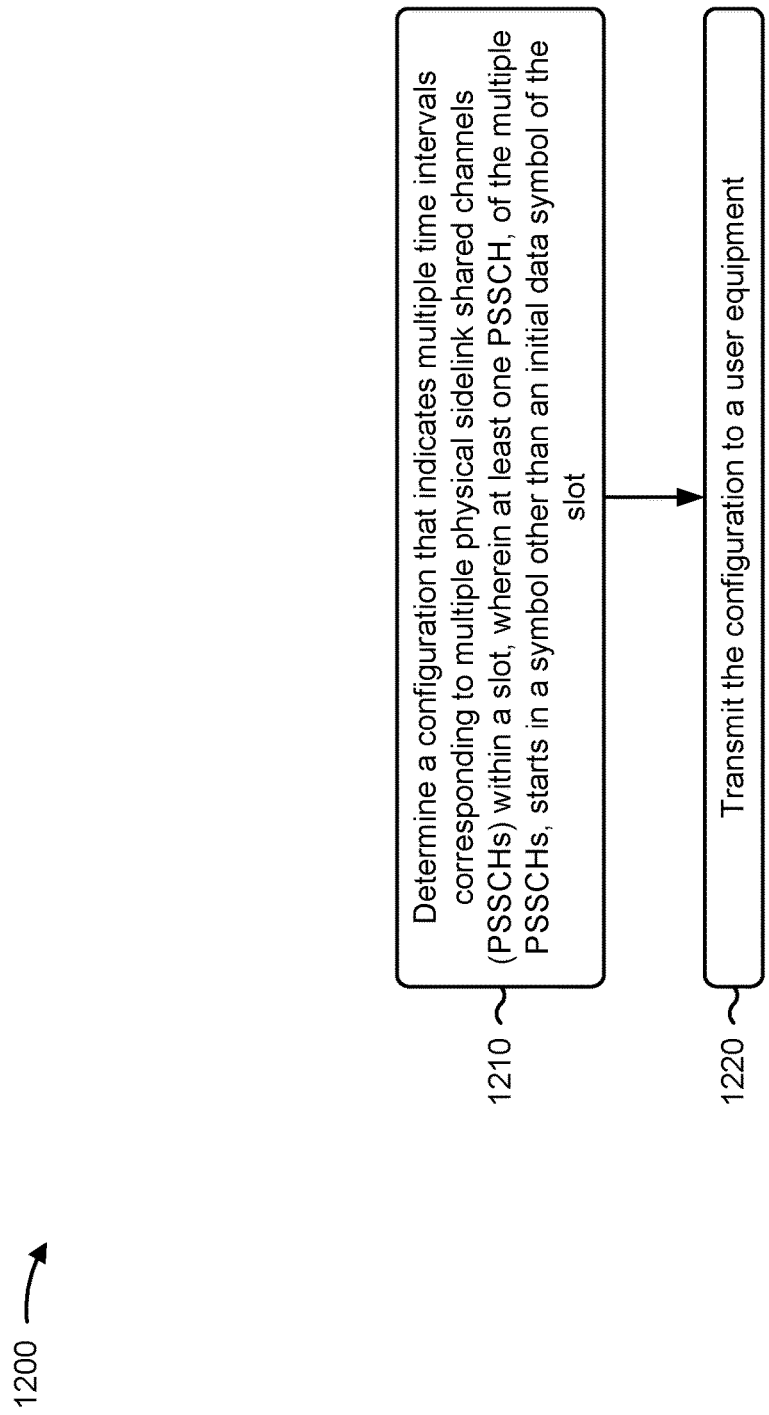

FIG. 12 is a diagram illustrating an example process 1200 performed, for example, by a base station, in accordance with the present disclosure. Example process 1200 is an example where the base station (e.g., base station 110) performs operations associated with wireless communication using sub-slot based physical sidelink shared channels.

As shown in FIG. 12, in some aspects, process 1200 may include determining a configuration that indicates multiple time intervals corresponding to multiple PSSCHs within a slot, wherein at least one PSSCH, of the multiple PSSCHs, starts in a symbol other than an initial data symbol of the slot (block 1210). For example, the base station (e.g., using communication manager 150 and/or determination component 1408, depicted in FIG. 14) may determine a configuration that indicates multiple time intervals corresponding to multiple PSSCHs within a slot, wherein at least one PSSCH, of the multiple PSSCHs, starts in a symbol other than an initial data symbol of the slot, as described above.

As further shown in FIG. 12, in some aspects, process 1200 may include transmitting the configuration to a user equipment (block 1220). For example, the base station (e.g., using communication manager 150 and/or transmission component 1404, depicted in FIG. 14) may transmit the configuration to a user equipment, as described above.

Process 1200 may include additional aspects, such as any single aspect or any combination of aspects described below and/or in connection with one or more other processes described elsewhere herein.

In a first aspect, the configuration indicates at least one of a number of PSSCHs included in the slot, a starting position of one or more PSSCHs, of the multiple PSSCHs, within the slot, or a duration of one or more PSSCHs, of the multiple PSSCHs, within the slot.

In a second aspect, alone or in combination with the first aspect, the multiple PSSCHs are contiguous within the slot.

In a third aspect, alone or in combination with one or more of the first and second aspects, an initial PSSCH, scheduled in the initial data symbol of the slot, includes a physical sidelink control channel.

In a fourth aspect, alone or in combination with one or more of the first through third aspects, each PSSCH, of the multiple PSSCHs, is fully contained within the slot and does not cross a slot boundary.

In a fifth aspect, alone or in combination with one or more of the first through fourth aspects, each PSSCH, of the multiple PSSCHs, includes at least one demodulation reference signal.

In a sixth aspect, alone or in combination with one or more of the first through fifth aspects, an initial PSSCH, scheduled in the initial data symbol of the slot, uses a legacy demodulation reference symbol pattern if a number of symbols included in the initial PSSCH satisfies a threshold.

In a seventh aspect, alone or in combination with one or more of the first through sixth aspects, an initial PSSCH, scheduled in the initial data symbol of the slot, includes a single demodulation reference signal in the initial data symbol if a number of symbols included in the initial PSSCH does not satisfy a threshold.

In an eighth aspect, alone or in combination with one or more of the first through seventh aspects, each PSSCH, that starts in a symbol other than the initial data symbol of the slot, includes a demodulation reference signal in an initial symbol of that PSSCH.

In a ninth aspect, alone or in combination with one or more of the first through eighth aspects, the configuration indicates a location of one or more demodulation reference signals within one or more PSSCHs of the multiple PSSCHs.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
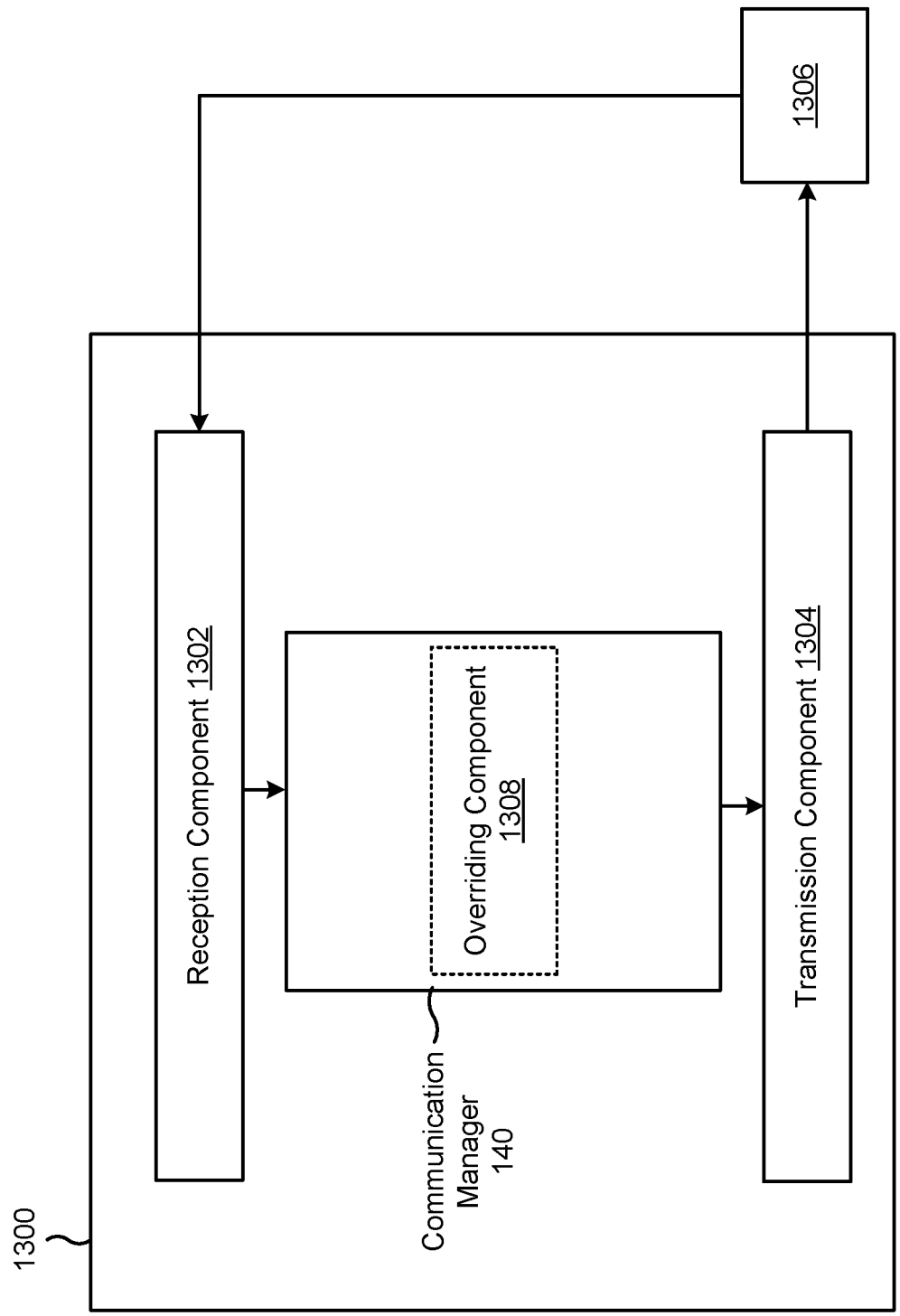
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include an overriding component 1308, among other examples.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive a configuration that indicates multiple time intervals corresponding to multiple PSSCHs within a slot, wherein at least one PSSCH, of the multiple PSSCHs, starts in a symbol other than an initial data symbol of the slot. The reception component 1302 and/or the transmission component 1304 may communicate in one or more PSSCHs, of the multiple PSSCHs, within the slot based at least in part on the configuration.

The reception component 1302 may receive SCI-1 that indicates a PSSCH pattern in a time domain for the multiple PSSCHs. The reception component 1302 may receive a PSCCH communication that includes control information applicable to all of the PSSCHs in the slot. The reception component 1302 may receive SCI-1 that indicates whether the multiple PSSCHs are enabled or disabled for the slot. The reception component 1302 may receive SCI-1 that indicates a common modulation and coding scheme for all PSSCHs in the slot. The overriding component 1308 may override the common modulation and coding scheme for a particular PSSCH with a per-PSSCH modulation and coding scheme indicated in SCI-2 corresponding to the particular PSSCH. The reception component 1302 may receive SCI-1 that indicates one or more values of a rate matching parameter for multiple SCI-2 corresponding to the multiple PSSCHs within the slot.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
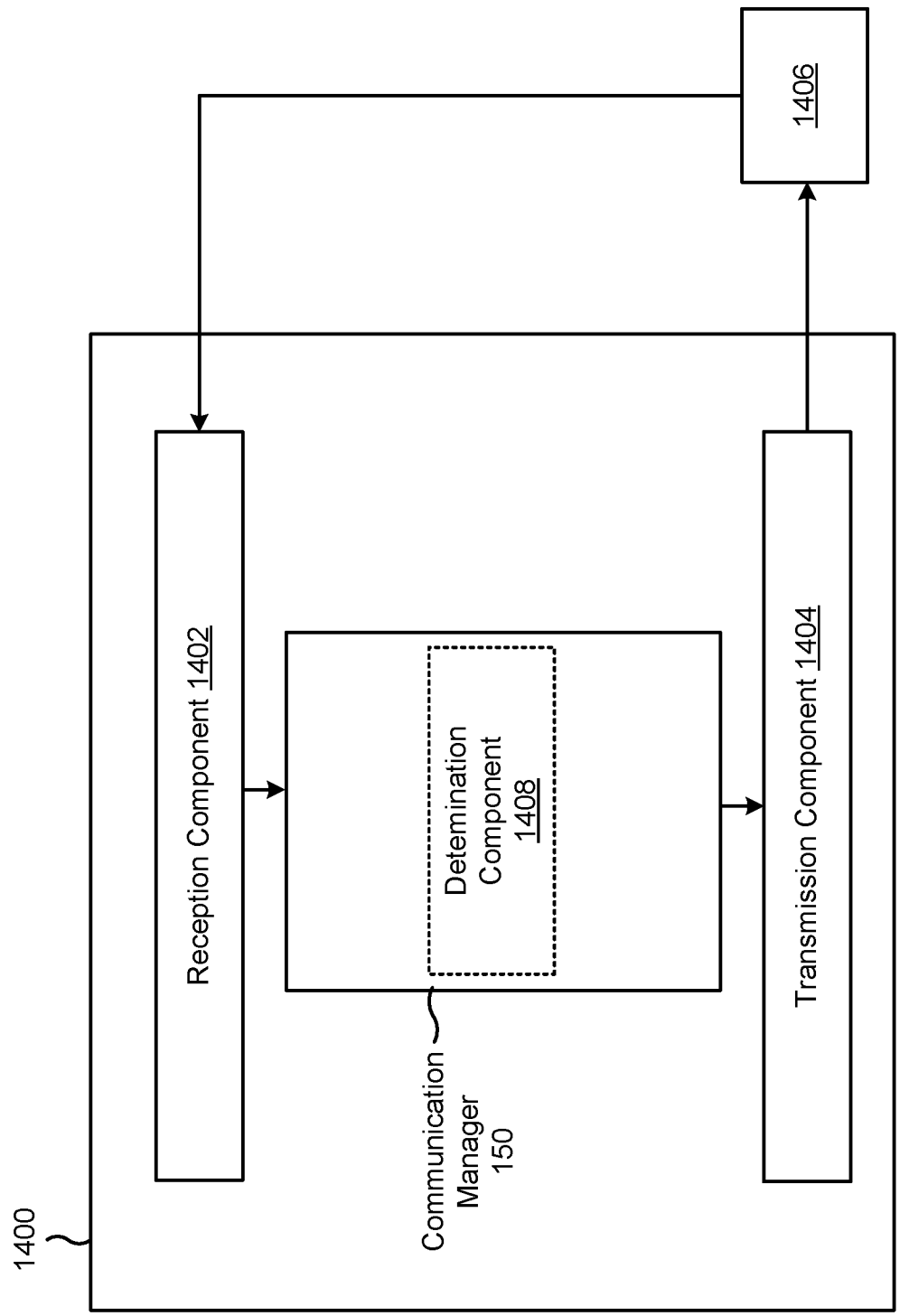

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a determination component 1408, among other examples.

In some aspects, the apparatus 1400 may be configured to perform one or more operations described herein in connection with FIGS. 6-9. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The determination component 1408 may determine a configuration that indicates multiple time intervals corresponding to multiple PSSCHs within a slot, wherein at least one PSSCH, of the multiple PSSCHs, starts in a symbol other than an initial data symbol of the slot. The transmission component 1404 may transmit the configuration to a user equipment.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot; and communicating in one or more PSSCHs, of the multiple PSSCHs, within the slot based at least in part on the configuration.

Aspect 2: The method of Aspect 1, wherein the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

Aspect 3: The method of any of Aspects 1-2, wherein the multiple PSSCHs are contiguous within the slot.

Aspect 4: The method of any of Aspects 1-3, wherein an initial PSSCH, scheduled in the initial data symbol of the slot, includes a physical sidelink control channel.

Aspect 5: The method of any of Aspects 1-4, wherein each PSSCH, of the multiple PSSCHs, is fully contained within the slot and does not cross a slot boundary.

Aspect 6: The method of any of Aspects 1-5, wherein each PSSCH, of the multiple PSSCHs, includes at least one demodulation reference signal.

Aspect 7: The method of any of Aspects 1-6, wherein an initial PSSCH, scheduled in the initial data symbol of the slot, uses a legacy demodulation reference symbol pattern if a number of symbols included in the initial PSSCH satisfies a threshold.

Aspect 8: The method of any of Aspects 1-7, wherein an initial PSSCH, scheduled in the initial data symbol of the slot, includes a single demodulation reference signal in the initial data symbol if a number of symbols included in the initial PSSCH does not satisfy a threshold.

Aspect 9: The method of any of Aspects 1-8, wherein each PSSCH, that starts in a symbol other than the initial data symbol of the slot, includes a demodulation reference signal in an initial symbol of that PSSCH.

Aspect 10: The method of any of Aspects 1-9, wherein the configuration indicates a location of one or more demodulation reference signals within one or more PSSCHs of the multiple PSSCHs.

Aspect 11: The method of any of Aspects 1-10, further comprising receiving first-stage sidelink control information (SCI-1) that indicates a PSSCH pattern in a time domain for the multiple PSSCHs.

Aspect 12: The method of Aspect 11, wherein the configuration indicates multiple PSSCH patterns, and wherein the SCI-1 includes an index that identifies the PSSCH pattern from the multiple PSSCH patterns.

Aspect 13: The method of Aspect 11, wherein the PSSCH pattern is indicated via a demodulation reference signal pattern indicated in the SCI-1.

Aspect 14: The method of any of Aspects 1-13, further comprising receiving a physical sidelink control channel (PSCCH) communication that includes control information applicable to all of the PSSCHs in the slot.

Aspect 15: The method of Aspect 14, wherein the PSCCH communication indicates at least one of: a common resource reservation for all PSSCHs in the slot, a priority associated with all PSSCHs in the slot, or a second-stage sidelink control information format for all PSSCHs in the slot.

Aspect 16: The method of any of Aspects 1-15, further comprising receiving first-stage sidelink control information that indicates whether the multiple PSSCHs are enabled or disabled for the slot.

Aspect 17: The method of any of Aspects 1-16, wherein each PSSCH, of the multiple PSSCHs, includes, in an initial symbol of that PSSCH, second-stage sidelink control information (SCI-2) for that PSSCH.

Aspect 18: The method of Aspect 17, wherein the SCI-2 indicates at least one of: a modulation and coding scheme for a corresponding PSSCH, or one or more resources for transmission of acknowledgement or negative acknowledgement feedback associated with the corresponding PSSCH.

Aspect 19: The method of any of Aspects 17-18, further comprising: receiving first-stage sidelink control information that indicates a common modulation and coding scheme for all PSSCHs in the slot; and overriding the common modulation and coding scheme for a particular PSSCH with a per-PSSCH modulation and coding scheme indicated in SCI-2 corresponding to the particular PSSCH.

Aspect 20: The method of any of Aspects 17-19, further comprising receiving first-stage sidelink control information (SCI-1) that indicates one or more values of a rate matching parameter for multiple SCI-2 corresponding to the multiple PSSCHs within the slot.

Aspect 21: The method of Aspect 20, wherein the SCI-1 indicates different values of the rate matching parameter for different PSSCHs within the slot.

Aspect 22: The method of Aspect 20, wherein the SCI-1 indicates a common value of the rate matching parameter for all PSSCHs within the slot.

Aspect 23: The method of any of Aspects 17-22, wherein a common modulation and coding scheme, indicated in first-stage sidelink control information for all PSSCHs within the slot, is used to determine resource elements for a particular SCI-2 for rate matching of resource elements for a PSSCH corresponding to the particular SCI-2.

Aspect 24: The method of any of Aspects 17-23, wherein one or more symbols of a particular SCI-2 are mapped to demodulation reference signal symbols that occur at a beginning of a PSSCH corresponding to the particular SCI-2.

Aspect 25: The method of any of Aspects 1-24, wherein communication in the one or more PSSCHs comprises: transmitting data in a first PSSCH, of the one or more PSSCHs, in which a data transmission is scheduled; and transmitting padding in a second PSSCH, of the one or more PSSCHs, in which a data transmission is not scheduled.

Aspect 26: A method of wireless communication performed by a base station, comprising: determining a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot; and transmitting the configuration to a user equipment.

Aspect 27: The method of Aspect 26, wherein the configuration indicates at least one of: a number of PSSCHs included in the slot; a starting position of one or more PSSCHs, of the multiple PSSCHs, within the slot; or a duration of one or more PSSCHs, of the multiple PSSCHs, within the slot.

Aspect 28: The method of any of Aspects 26-27, wherein the multiple PSSCHs are contiguous within the slot.

Aspect 29: The method of any of Aspects 26-28, wherein an initial PSSCH, scheduled in the initial data symbol of the slot, includes a physical sidelink control channel.

Aspect 30: The method of any of Aspects 26-29, wherein each PSSCH, of the multiple PSSCHs, is fully contained within the slot and does not cross a slot boundary.

Aspect 31: The method of any of Aspects 26-30, wherein each PSSCH, of the multiple PSSCHs, includes at least one demodulation reference signal.

Aspect 32: The method of any of Aspects 26-31, wherein an initial PSSCH, scheduled in the initial data symbol of the slot, uses a legacy demodulation reference symbol pattern if a number of symbols included in the initial PSSCH satisfies a threshold.

Aspect 33: The method of any of Aspects 26-32, wherein an initial PSSCH, scheduled in the initial data symbol of the slot, includes a single demodulation reference signal in the initial data symbol if a number of symbols included in the initial PSSCH does not satisfy a threshold.

Aspect 34: The method of any of Aspects 26-33, wherein each PSSCH, that starts in a symbol other than the initial data symbol of the slot, includes a demodulation reference signal in an initial symbol of that PSSCH.

Aspect 35: The method of any of Aspects 26-34, wherein the configuration indicates a location of one or more demodulation reference signals within one or more PSSCHs of the multiple PSSCHs.

Aspect 36: An apparatus for wireless communication at a device, comprising a processor; memory coupled with the processor; and instructions stored in the memory and executable by the processor to cause the apparatus to perform the method of one or more of Aspects 1-25.

Aspect 37: A device for wireless communication, comprising a memory and one or more processors coupled to the memory, the one or more processors configured to perform the method of one or more of Aspects 1-25.

Aspect 38: An apparatus for wireless communication, comprising at least one means for performing the method of one or more of Aspects 1-25.

Aspect 39: A non-transitory computer-readable medium storing code for wireless communication, the code comprising instructions executable by a processor to perform the method of one or more of Aspects 1-25.

Aspect 40: A non-transitory computer-readable medium storing a set of instructions for wireless communication, the set of instructions comprising one or more instructions that, when executed by one or more processors of a device, cause the device to perform the method of one or more of Aspects 1-25.

Aspect 41: An apparatus for wireless communication at a device, comprising a processor; memory coupled with the processor; and instructions stored in the memory and executable by the processor to cause the apparatus to perform the method of one or more of Aspects 26-35.

Aspect 42: A device for wireless communication, comprising a memory and one or more processors coupled to the memory, the one or more processors configured to perform the method of one or more of Aspects 26-35.

Aspect 43: An apparatus for wireless communication, comprising at least one means for performing the method of one or more of Aspects 26-35.

Aspect 44: A non-transitory computer-readable medium storing code for wireless communication, the code comprising instructions executable by a processor to perform the method of one or more of Aspects 26-35.

Aspect 45: A non-transitory computer-readable medium storing a set of instructions for wireless communication, the set of instructions comprising one or more instructions that, when executed by one or more processors of a device, cause the device to perform the method of one or more of Aspects 26-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot;
receiving first first-stage sidelink control information that indicates whether the multiple PSSCHs are enabled or disabled for the slot; and
communicating in one or more PSSCHs, of the multiple PSSCHs, within the slot based at least in part on the configuration or the first first-stage sidelink control information.

2. The method of claim 1, wherein the configuration indicates at least one of:
a number of PSSCHs included in the slot;
a starting position of one or more PSSCHs, of the multiple PSSCHs, within the slot; or
a duration of one or more PSSCHs, of the multiple PSSCHs, within the slot.

3. The method of claim 1, wherein the multiple PSSCHs are contiguous within the slot.

4. The method of claim 1, wherein an initial PSSCH, scheduled in the initial data symbol of the slot, includes a physical sidelink control channel.

5. The method of claim 1, wherein each PSSCH, of the multiple PSSCHs, is fully contained within the slot and does not cross a slot boundary.

6. The method of claim 1, wherein each PSSCH, of the multiple PSSCHs, includes at least one demodulation reference signal.

7. The method of claim 1, wherein an initial PSSCH, scheduled in the initial data symbol of the slot, uses a legacy demodulation reference symbol pattern if a number of symbols included in the initial PSSCH satisfies a threshold.

8. The method of claim 1, wherein an initial PSSCH, scheduled in the initial data symbol of the slot, includes a single demodulation reference signal in the initial data symbol if a number of symbols included in the initial PSSCH does not satisfy a threshold.

9. The method of claim 1, wherein each PSSCH, of the multiple PSSCHs, that starts in a symbol other than the initial data symbol of the slot, includes a demodulation reference signal in an initial symbol of that PSSCH.

10. The method of claim 1, wherein the configuration indicates a location of one or more demodulation reference signals within one or more PSSCHs of the multiple PSSCHs.

11. The method of claim 1, further comprising receiving second first-stage sidelink control information (SCI-1) that indicates a PSSCH pattern in a time domain for the multiple PSSCHs.

12. The method of claim 1, further comprising receiving a physical sidelink control channel (PSCCH) communication that includes control information applicable to all of the multiple PSSCHs in the slot.

13. The method of claim 1, wherein each PSSCH, of the multiple PSSCHs, includes, in an initial symbol of that PSSCH, second-stage sidelink control information (SCI-2) for that PSSCH.

14. The method of claim 13, wherein the SCI-2 indicates at least one of:
a modulation and coding scheme for a corresponding PSSCH, or
one or more resources for transmission of acknowledgement or negative acknowledgement feedback associated with the corresponding PSSCH.

15. The method of claim 13, further comprising:
receiving third first-stage sidelink control information that indicates a common modulation and coding scheme for all PSSCHs in the slot; and
overriding the common modulation and coding scheme for a particular PSSCH with a per-PSSCH modulation and coding scheme indicated in SCI-2 corresponding to the particular PSSCH.

16. The method of claim 15, wherein the common modulation and coding scheme, indicated in the third first-stage sidelink control information for all PSSCHs within the slot, is used to determine resource elements for a particular SCI-2 for rate matching of resource elements for a PSSCH corresponding to the particular SCI-2.

17. The method of claim 13, further comprising receiving fourth first-stage sidelink control information (SCI-1) that indicates one or more values of a rate matching parameter for multiple SCI-2 corresponding to the multiple PSSCHs within the slot.

18. The method of claim 13, wherein one or more symbols of a particular SCI-2 are mapped to demodulation reference signal symbols that occur at a beginning of a PSSCH corresponding to the particular SCI-2.

19. The method of claim 1, wherein communication in the one or more PSSCHs comprises:
transmitting data in a first PSSCH, of the one or more PSSCHs, in which a data transmission is scheduled; and
transmitting padding in a second PSSCH, of the one or more PSSCHs, in which a data transmission is not scheduled.

20. A method of wireless communication performed by a base station, comprising:
determining a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot;
determining first-stage sidelink control information that indicates whether the multiple PSSCHs are enabled or disabled for the slot; and
transmitting the configuration and the first-stage sidelink control information to a user equipment.

21. The method of claim 20, wherein the configuration indicates at least one of:
a number of PSSCHs included in the slot;
a starting position of one or more PSSCHs, of the multiple PSSCHs, within the slot; or
a duration of one or more PSSCHs, of the multiple PSSCHs, within the slot.

22. A user equipment (UE), comprising:
one or more memories; and
one or more processors, coupled to the one or more memories, configured to:
receive a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot;
receiving first first-stage sidelink control information that indicates whether the multiple PSSCHs are enabled or disabled for the slot; and
communicate in one or more PSSCHs, of the multiple PSSCHs, within the slot based at least in part on the configuration or the first first-stage sidelink control information.

23. The UE of claim 22, wherein the configuration indicates at least one of:
a number of PSSCHs included in the slot;
a starting position of one or more PSSCHs, of the multiple PSSCHs, within the slot; or
a duration of one or more PSSCHs, of the multiple PSSCHs, within the slot.

24. The UE of claim 22, wherein the one or more processors are further configured to receive second first-stage sidelink control information (SCI-1) that indicates a PSSCH pattern in a time domain for the multiple PSSCHs.

25. The UE of claim 22, wherein each PSSCH, of the multiple PSSCHs, includes, in an initial symbol of that PSSCH, second-stage sidelink control information (SCI-2) for that PSSCH.

26. The UE of claim 25, wherein the SCI-2 indicates at least one of:
a modulation and coding scheme for a corresponding PSSCH, or
one or more resources for transmission of acknowledgement or negative acknowledgement feedback associated with the corresponding PSSCH.

27. A base station, comprising:
one or more memories; and
one or more processors, coupled to the one or more memories, configured to:
determine a configuration that indicates multiple time intervals corresponding to multiple physical sidelink shared channels (PSSCHs) within a slot, wherein at least one PSSCH, of the multiple PSSCHs, starts in a symbol other than an initial data symbol of the slot;

determine first-stage sidelink control information that indicates whether the multiple PSSCHs are enabled or disabled for the slot; and transmit the configuration and the first-stage sidelink control information to a user equipment.

28. The base station of claim 27, wherein the configuration indicates at least one of:

a number of PSSCHs included in the slot;

a starting position of one or more PSSCHs, of the multiple PSSCHs, within the slot; or a duration of one or more PSSCHs, of the multiple PSSCHs, within the slot.

* * * * *